United States Patent
Tsuda et al.

(10) Patent No.: US 10,524,306 B2
(45) Date of Patent: Dec. 31, 2019

(54) TELECOMMUNICATIONS APPARATUS AND METHODS

(71) Applicant: SONY CORPORATION, Tokyo (JP)

(72) Inventors: Shinichiro Tsuda, Basingstoke (GB); Yuxin Wei, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/781,492

(22) PCT Filed: Dec. 12, 2016

(86) PCT No.: PCT/EP2016/080696
§ 371 (c)(1),
(2) Date: Jun. 5, 2018

(87) PCT Pub. No.: WO2017/108487
PCT Pub. Date: Jun. 29, 2017

(65) Prior Publication Data
US 2018/0359805 A1 Dec. 13, 2018

(30) Foreign Application Priority Data
Dec. 21, 2015 (EP) .................................. 15201658.0

(51) Int. Cl.
*H04W 4/00* (2018.01)
*H04W 76/38* (2018.01)
(Continued)

(52) U.S. Cl.
CPC ........... *H04W 76/38* (2018.02); *H04W 24/10* (2013.01); *H04W 28/0278* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 2003/0108007 A1* | 6/2003 | Holcman | .......... | H04W 36/0038 370/331 |
| 2008/0285500 A1* | 11/2008 | Zhang | ................ | H04B 7/15507 370/315 |

(Continued)

FOREIGN PATENT DOCUMENTS

| | | |
|---|---|---|
| EP | 2 369 892 A1 | 9/2011 |
| WO | WO 2013/086316 A1 | 6/2013 |
| WO | WO 2017/080704 A1 | 5/2017 |

OTHER PUBLICATIONS

Holma, H. et al., "LTE for UMTS OFDMA and SC-FDMA Based Radio Access", John Wiley and Sons, ltd, 2009, 8 pages.

(Continued)

*Primary Examiner* — Atique Ahmed
(74) *Attorney, Agent, or Firm* — Xsensus LLP

(57) ABSTRACT method is for use in a mobile telecommunications network that comprises a base station providing wireless connectivity within a base station cell, a mobile node providing wireless connectivity within a local cell and configured to communicate wirelessly with the base station, and a terminal configured to communicate wirelessly with the base station and configured to communicate wirelessly with the mobile node; and the method comprises: activating a limited local radio connection between the terminal and the mobile node; starting a first timer of fixed duration when or after the limited local radio connection is activated; and when the first timer has expired, activating a limited base station radio connection between the terminal and the base station and terminating the limited local radio connection between the terminal and the mobile node.

21 Claims, 10 Drawing Sheets

(51) Int. Cl.
  *H04W 76/27* (2018.01)
  *H04W 36/30* (2009.01)
  *H04W 88/04* (2009.01)
  *H04W 76/28* (2018.01)
  *H04W 24/10* (2009.01)
  *H04W 28/02* (2009.01)
  *H04W 76/19* (2018.01)

(52) U.S. Cl.
  CPC ........... *H04W 36/30* (2013.01); *H04W 76/27* (2018.02); *H04W 76/28* (2018.02); *H04W 88/04* (2013.01); *H04W 76/19* (2018.02)

(56) References Cited

U.S. PATENT DOCUMENTS

| | | | |
|---|---|---|---|
| 2010/0315948 A1* | 12/2010 | Yi | H04L 47/10 370/235 |
| 2011/0081903 A1* | 4/2011 | Cai | H04W 36/0058 455/424 |
| 2011/0292866 A1* | 12/2011 | Zheng | H04W 52/0225 370/315 |
| 2013/0122892 A1 | 5/2013 | Morioka et al. | |
| 2014/0192781 A1* | 7/2014 | Teyeb | H04W 36/34 370/331 |
| 2014/0295820 A1* | 10/2014 | Kim | H04W 52/0216 455/418 |
| 2014/0349647 A1* | 11/2014 | Chen | H04W 36/30 455/436 |
| 2014/0349694 A1* | 11/2014 | Raghothaman | H04W 36/00 455/509 |
| 2015/0092554 A1* | 4/2015 | Mochizuki | H04W 24/10 370/235 |
| 2016/0241325 A1 | 8/2016 | Raghothaman et al. | |
| 2016/0286590 A1* | 9/2016 | Cheng | H04W 4/90 |
| 2018/0092017 A1* | 3/2018 | Freda | H04W 76/14 |
| 2018/0192345 A1* | 7/2018 | Yun | H04W 36/30 |

OTHER PUBLICATIONS

TS 36.331, V12.7.0, 3$^{rd}$ Generation partnership Project; Technical Specification Group Radio Access Network; Evolved Universal Terrestrial Radio Access (E-UTRA); Radio Resource Control (RRC); Protocol specification; Release 12, Sep. 2015, 453 pages.
3GPP TS 36.300, V10.0.0; 4.7 Support for relaying; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 10), Jun. 2010, 183 pages.
International Search Report dated Feb. 1, 2017 in PCT/EP2016/080696 filed Dec. 12, 2016.

* cited by examiner

TELECOMMUNICATIONS APPARATUS AND METHODS

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile telecommunication systems, such as those based on the 3GPP defined UMTS and Long Term Evolution (LTE) and Long Term Evolution Advanced (LTE-A) architecture, are able to support more sophisticated services than simple voice and messaging services offered by previous generations of mobile telecommunication systems. For example, with the improved radio interface and enhanced data rates provided by LTE systems, users can enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may be particularly relevant in situations in which there is a desire for a group of terminal devices (communications devices) to exchange information with each other in a fast and reliable manner. To help address these limitations approaches have been proposed in which terminal devices within a wireless telecommunications system may be configured to communicate data directly with one another without some or all their communications passing through an infrastructure equipment element, such as a base station. Such communications are commonly referred to generally as a device-to-device (D2D) communications. Many device-to-device communications may be transmitted by one device to a plurality of other devices in a broadcast like manner and so in that sense the phrase "device-to-device communications" also covers "device-to-devices communications".

Thus, D2D communications allow communications devices that are in sufficiently close proximity to directly communicate with each other, both when within the coverage area of a network and when outside a network's coverage area (e.g. due to geographic restrictions on a network's extent or because the network has failed or is in effect unavailable to a terminal device because the network is overloaded). D2D communications can allow user data to be more efficiently and quickly communicated between communications devices by obviating the need for user data to be relayed by a network entity such as a base station. D2D communications also allow communications devices to communicate with one another even when one or both devices may not be within the reliable coverage area of a network. The ability for communications devices to operate both inside and outside of coverage areas makes wireless telecommunications systems that incorporate D2D capabilities well suited to applications such as public protection/safety and disaster relief (PPDR), for example. PPDR related communications may benefit from a high degree of robustness whereby devices can continue to communicate with one another in congested networks and when outside a coverage area. 3GPP has developed some proposals for such public safety D2D use in LTE networks in Release12.

In parallel, the development of relay nodes and other local cell arrangements in telecommunications systems is expected to facilitate communications with base stations and potentially to expand the range of coverage of the base stations by relaying communications between terminal devices and base stations.

There is a need to provide appropriate resource allocation and management in local cell and D2D communication arrangements.

SUMMARY

The present disclosure can help address or mitigate at least some of the issues discussed above.

According to a first example aspect there is provided a method for use in a mobile telecommunications network, the mobile telecommunications network comprising a base station providing wireless connectivity within a base station cell, a mobile node providing wireless connectivity within a local cell and configured to communicate wirelessly with the base station, and a terminal configured to communicate wirelessly with the base station and configured to communicate wirelessly with the mobile node; the method comprising: activating a limited local radio connection between the terminal and the mobile node; starting a first timer of fixed duration when or after the limited local radio connection is activated; and when the timer has expired, activating a limited base station radio connection between the terminal and the base station and terminating the limited local radio connection between the terminal and the mobile node.

According to a second example aspect there is provided a mobile telecommunications network, the mobile telecommunications network comprising a base station providing wireless connectivity within a base station cell, a mobile node providing wireless connectivity within a local cell and configured to communicate wirelessly with the base station, and a terminal configured to communicate wirelessly with the base station and configured to communicate wirelessly with the mobile node, wherein the mobile telecommunications network is configured to: activate a limited local radio connection between the terminal and the mobile node; start a first timer of fixed duration when or after the limited local radio connection is activated; and when the timer has expired, activate a limited base station radio connection between the terminal and the base station and terminate the limited local radio connection between the terminal and the mobile node.

According to a third example aspect there is provided a mobile telecommunications network, the mobile telecommunications network comprising a base station providing wireless connectivity within a base station cell, a mobile node providing wireless connectivity within a local cell and configured to communicate wirelessly with the base station, and a terminal configured to communicate wirelessly with the base station and configured to communicate wirelessly with the mobile node, wherein the mobile telecommunications network is configured to carry out the method of the first aspect and/or any of its variations within the scope of the claims.

According to a fourth example aspect there is provided a method of operating a terminal for use in a mobile telecommunications network comprising a base station providing wireless connectivity within a base station cell, and a mobile node providing wireless connectivity within a local cell and configured to communicate wirelessly with the base station, wherein the terminal comprises a transmitter, a receiver and a controller and is configured to communicate wirelessly with the base station and to communicate wirelessly with the mobile node, the method comprising: the terminal activating a limited local radio connection between the terminal and the mobile node; the terminal starting a first timer of fixed duration when or after the limited local radio connection is activated; and when the timer has expired, the terminal activating a limited base station radio connection between the terminal and the base station and terminating the limited local radio connection between the terminal and the mobile node.

According to a fifth example aspect there is provided a terminal for use in a mobile telecommunications network comprising a base station providing wireless connectivity within a base station cell, and a mobile node providing wireless connectivity within a local cell and configured to communicate wirelessly with the base station, wherein the terminal comprises a transmitter, a receiver and a controller and is configured to communicate wirelessly with the base station and to communicate wirelessly with the mobile node, wherein the terminal is further configured to: activate a limited local radio connection between the terminal and the mobile node; start a first timer of fixed duration when or after the limited local radio connection is activated; and when the timer has expired, activate a limited base station radio connection between the terminal and the base station and terminating the limited local radio connection between the terminal and the mobile node.

According to a sixth example aspect there is provided circuitry for a terminal for use in a mobile telecommunications network comprising a base station providing wireless connectivity within a base station cell, and a mobile node providing wireless connectivity within a local cell and configured to communicate wirelessly with the base station; wherein the circuitry comprises a controller element and a transceiver element configured to operate together to: activate a limited local radio connection between the terminal and the mobile node; start a first timer of fixed duration when or after the limited local radio connection is activated; and when the timer has expired, activate a limited base station radio connection between the terminal and the base station and terminating the limited local radio connection between the terminal and the mobile node.

According to a seventh example aspect there is provided a method of operating a mobile node in a mobile telecommunications network comprising a base station providing wireless connectivity within a base station cell, the mobile node which is configured to provide wireless connectivity within a local cell and configured to communicate wirelessly with the base station, and a terminal configured to communicate wirelessly with the base station and configured to communicate wirelessly with the mobile node, the method comprising the mobile node: activating wireless connectivity to the terminal within the local cell; starting a timer of fixed duration when or after wireless connectivity is activated; and when the timer has expired, terminating the wireless connectivity to the terminal within the local cell.

According to an eighth example aspect there is provided a mobile node for use in a mobile telecommunications network comprising a base station providing wireless connectivity within a base station cell, the mobile node which is configured to provide wireless connectivity within a local cell and configured to communicate wirelessly with the base station, and a terminal configured to communicate wirelessly with the base station and configured to communication wirelessly with the mobile node, the mobile node comprising a transmitter, a receiver and a controller, and further configured to: activate wireless connectivity to the terminal within the local cell; start a timer of fixed duration when or after wireless connectivity is activated; and when the timer has expired, terminate the wireless connectivity to the terminal within the local cell.

According to a ninth example aspect there is provided circuitry for a mobile node for use in a mobile telecommunications network comprising a base station providing wireless connectivity within a base station cell, the mobile node, and a terminal configured to communicate wirelessly with the base station and configured to communicate wirelessly with the mobile node, circuitry comprising a controller element and a transceiver element configured to: operate together to provide wireless connectivity within a local cell and to communicate with the base station; activate wireless connectivity to the terminal within the local cell; start a timer of fixed duration when or after the wireless connectivity to the terminal within the local cell is activated; and when the timer has expired, terminate the wireless connectivity to the terminal within the local cell.

According to a tenth example aspect there is provided a method of operating a base station in a mobile telecommunications network, the base station comprising a transmitter, a receiver and a controller and being configured to provide wireless connectivity within a base station cell, the mobile telecommunications network comprising the base station, a mobile node providing wireless connectivity within a local cell and configured to communicate wirelessly with the base station, and a terminal configured to communicate wirelessly with the base station and configured to communicate wirelessly with the mobile node, the base station further configured to: activate a limited base station radio connection between the terminal and the base station when a timer of fixed duration has expired after having been started in response to activation of a limited local radio connection between the terminal and the mobile node.

According to an eleventh example aspect there is provided a base station for use in a mobile telecommunications network comprising the base station, a mobile node providing wireless connectivity within a local cell and configured to communicate wirelessly with the base station, and a terminal configured to communicate wirelessly with the base station and configured to communicate wirelessly with the mobile node, the base station comprising a transmitter, a receiver and a controller and being configured to: provide wireless connectivity within a base station cell; and activate a limited base station radio connection between the terminal and the base station when a timer of fixed duration has expired after having been started in response to activation of a limited local radio connection between the terminal and the mobile node.

According to a twelfth example aspect there is provided circuitry for a base station for use in a mobile telecommunications network comprising the base station, a mobile node providing wireless connectivity within a local cell and configured to communicate wirelessly with the base station, and a terminal configured to communicate wirelessly with the base station and configured to communicate wirelessly with the mobile node, the circuitry comprising a controller element and a transceiver element configured to: provide wireless connectivity within a base station cell; and activate a limited base station radio connection between the terminal and the base station when a timer of fixed duration has expired after having been started in response to activation of a limited local radio connection between the terminal and the mobile node.

According to a thirteenth example aspect and to a fourteenth example aspect there are respectively provided computer software which, when executed by a computer causes the computer to perform any of the above methods (and any of their variations falling within the scope of the claims), and a storage medium which stores the computer software.

Further respective aspects and features are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
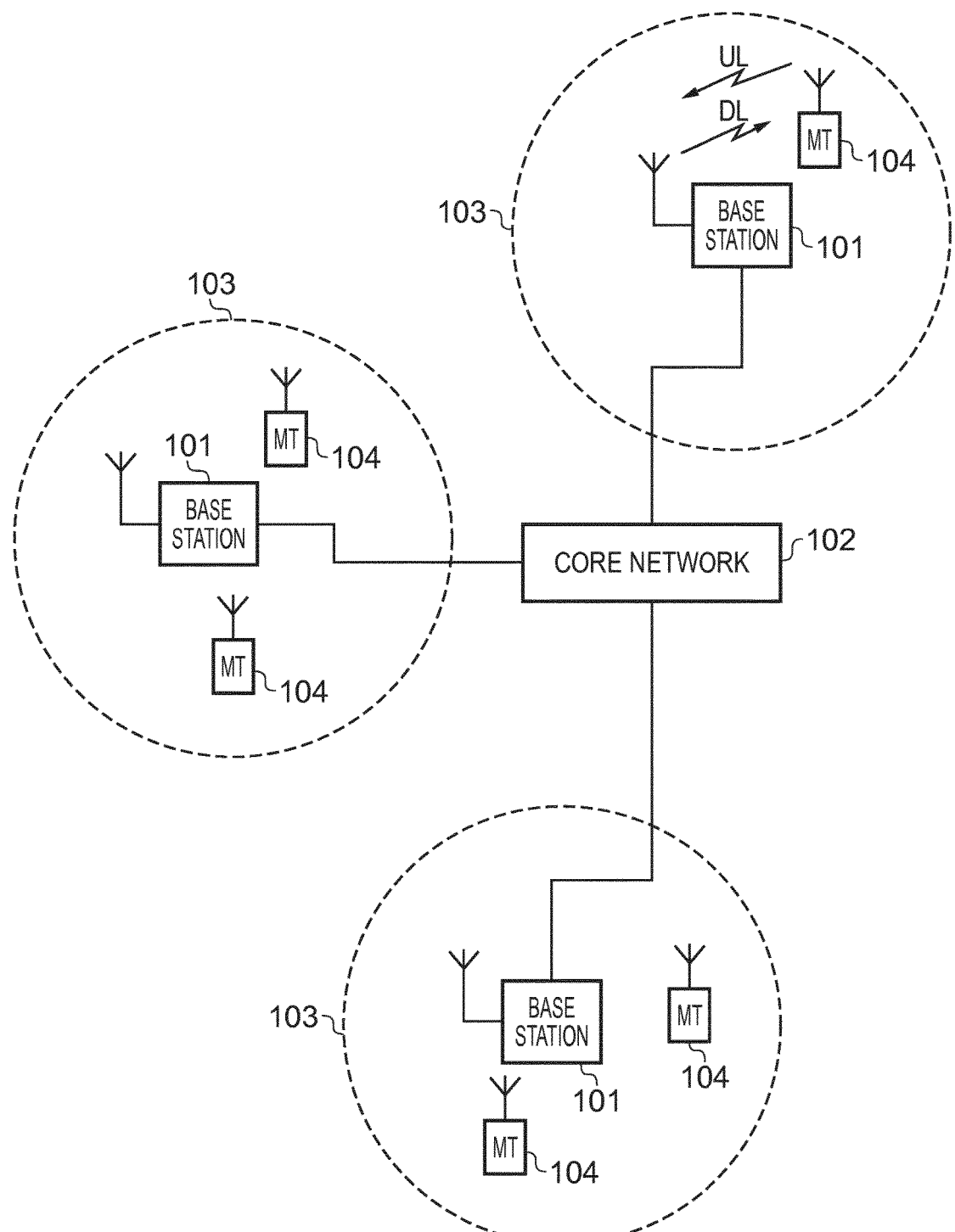
FIG. 1 shows a schematic diagram of an example mobile telecommunications network or system.

FIG. 1 shows a schematic diagram illustrating some basic functionality of a mobile (cellular) telecommunications network/system, in this example operating generally in accordance with LTE principles, and which may be adapted to implement embodiments of the disclosure as described further below. Various elements of FIG. 1 and their respective modes of operation are well-known and defined in the relevant standards administered by the 3GPP® body, and also described in many books on the subject, for example, Holma, H. and Toskala, A. [1]. It will be appreciated that operational aspects of the telecommunications network which are not specifically described below may be implemented in accordance with any known techniques, for example according to the relevant standards and known variations thereof. Furthermore, it will be appreciated that whilst some specific examples described herein may refer to implementations based around particular 3GPP implementations, the same principles can be applied regardless of the underlying operating principles of the network. That is to say, the same principles can be applied for wireless telecommunications networks operating in accordance with other standards, whether past, current or yet to be specified.

The network in FIG. 1 includes a plurality of base stations 101 connected to a core network 102. Each base station provides a coverage area or cell 103 within which data can be communicated to and from terminal devices 104. Data is transmitted from base stations 101 to terminal devices 104 within their respective coverage areas 103 via a radio downlink DL. Data is transmitted from terminal devices 104 to the base stations 101 via a radio uplink UL. The uplink and downlink communications are made using radio resources that may be used by the operator of the network. The core network 102 routes data to and from the terminal devices 104 via the respective base stations 101 and provides functions such as authentication, mobility management, charging and so on. In addition to the base stations 101 and terminal devices 104, the system may further comprise one or more relay nodes/devices. These may be used to enhance coverage for terminal devices operating in the relevant cell(s). The deployment of relay nodes (e.g. in terms of their locations) may follow generally established techniques for using relay nodes to support coverage in wireless telecommunications systems by assisting downlink and/or uplink communications. Regarding terminology, terminal devices may also be referred to as mobile stations, user equipment (UE), user terminal, terminal, mobile radio, mobile terminal, mobile device and so forth. Base stations may also be referred to as transceiver stations, nodeBs, e-nodeBs, eNBs and so forth. Relay nodes may also be referred to as relay devices, relays, and so forth. In some example implementations of the present disclosure, a terminal device may be operating as a relay node to assist in supporting communications associated with other terminal devices. That is to say, the functionality of a relay device may be provided by a suitably configured terminal device.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

Figure 2:
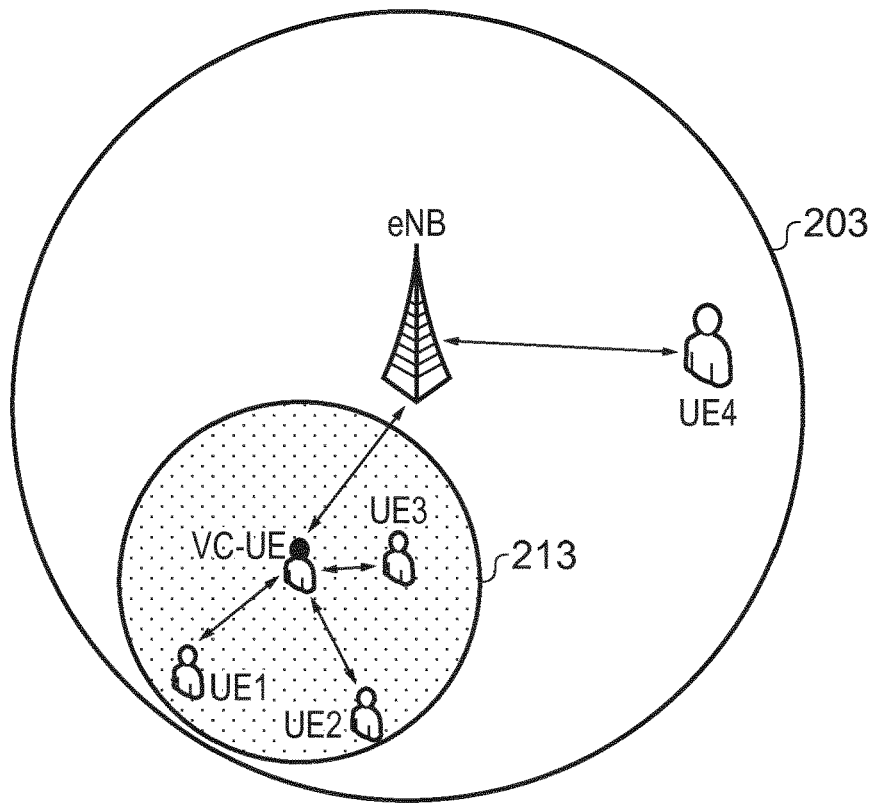
FIG. 2 shows a schematic representation of an example local cell arrangement.

It has been suggested that a UE might operate to provide a local cell or virtual cell (VC), whereby the UE will operate as an intermediate node between other UEs in its vicinity and the network (for example a base station), as well as an intermediate node between UEs. The UE may communicate with neighbouring UEs and provide them with connectivity to the base station (e.g. to reach the core network) and potentially to other neighbouring UEs as well. The UE provides the functions of a base station to the neighbouring UEs within its virtual cell coverage range. FIG. 2 schematically represents an example local cell arrangement. A base station eNB provides connectivity in a cell 203 (sometimes hereinafter referred to as a "base station cell" or simply "cell" if it is clear from the context that the cell is provided by a base station). At the same time, a UE operates as a "VC-UE" (for Virtual Cell UE) to provide connectivity via a virtual cell or local cell 213. In the example of FIG. 2, the VC-UE provides mobile connectivity to the three terminals UE1-UE3 while terminal UE4 is connected directly to the base station. In this example, only one virtual cell is provided in the cell although in some examples more VC may be activated, or no VC may be activated. In the following, "VC", "virtual cell" or "local cell" may sometimes be used interchangeably with "VC-UE" (or "mobile node" or equivalents), particularly with reference to functionality and operability.

Within a local cell, the VC-UE provides a UE with a wireless connectivity to the base station, for example to reach the core network or a remote destination outside of the mobile network (e.g. a public server available from the internet). The UE is connected to the VC-UE and uses it as if it were a base station and the VC-UE sends the messages to the base station if need be (e.g. messages for a remote destination, the base station, the core network, etc.), thereby offering connectivity to the base station. Additionally or alternatively, the VC-UE can offer local connectivity to UEs in the local cell. For example, if two UEs in the local cell wish to communicate with each other, the VC-UE can identify that the destination for the messages is within its local cell and send the messages directly to the destination. This feature can assist in offloading some of the traffic and traffic management load of the base station.

A VC-UE may communicate with UEs in its local cell using a wireless interface provided on one or more unlicensed, shared licensed and/or licensed bands, and may backhaul traffic to the network in any suitable way, although it is generally expected that this would be carried out using one or more licensed bands, for example to providing the backhauling over a wireless interface with a higher interference control.

A VC-UE is in effect a UE designated to provide a virtual cell function by working also as an intermediate node between UEs in its vicinity and the network, as well as an intermediate node between UEs. Note that the VC-UE does not operate in the same manner as a terminal-to-base station relay node as currently discussed in the 3GPP consortium, however. In effect such a relay is for relaying messages to the base station where the terminal is connected as an RRC (radio resource control) layer with the base station, but not with the relay node. In a virtual cell, the terminal is connected to the "relay" (VC-UE), which therefore operates more like an anchor than like a relay (in view of the present definition and use of 3GPP relays). With this type of service, it is envisaged that VC-UEs could manage certain aspects such as one or more of radio resource management, RRC connection control and the like, instead of reliance on the base station only for these aspects. A VC-UE may be expected not only to relay data but also to organize its own local network/cell from a radio/connection control perspective. The inclusion of such VC-UEs in a network may improve operational aspects, such as offloading some signalling overhead or resources allocation functions from the base station or by improving the efficiency of radio resource allocation, amongst other things.

In the context of 3GPP, a terminal and a base station can be either not connected, in a "RRC_IDLE" state, or in a "RRC_CONNECTED" state. Generally a terminal camping on a cell will be in RRC_IDLE, and when it wants to send data (user data) to the base station, it will transition into the RRC_CONNECTED state. Once data transmission is complete, the terminal can revert to RRC_IDLE. The base station maintains RRC connection context information for all terminals in its cell that are communicating with/through it. According to the current 3GPP Technical Specification document 36.331 [2], the RRC_IDLE and RRC_CONNECTED states are defined as follows:

RRC_IDLE:
 A UE specific DRX [Discontinuous Reception] may be configured by upper layers.
 UE controlled mobility;
 The UE:
  monitors a Paging channel to detect incoming calls, system information change, for ETWS [Earthquake and Tsunami Warning System] capable UEs, ETWS notification, and for CMAS [Commercial Mobile Alert Service] capable UEs, CMAS notification;
  performs neighbouring cell measurements and cell (re-) selection;
  acquires system information; and
  performs logging of available measurements together with location and time for logged measurement configured UEs.

RRC_CONNECTED:
 Transfer of unicast data to/from UE.
 At lower layers, the UE may be configured with a UE specific DRX.
 For UEs supporting CA [Carrier Aggregation], use of one or more SCells [Secondary Cells], aggregated with the PCell [Primary Cell], for increased bandwidth;
 For UEs supporting DC [Dual Connectivity], use of one SCG [Secondary Cell Group], aggregated with the MCG [Master Cell Group], for increased bandwidth;
 Network controlled mobility, i.e. handover and cell change order with optional network assistance (NACC [Network Assisted Cell Change]) to GERAN [GSM/EDGE Radio Access Network];
 The UE:
  monitors a Paging channel and/or System Information Block Type 1 contents to detect system information change, for ETWS capable UEs, ETWS notification, and for CMAS capable UEs, CMAS notification;
  monitors control channels associated with the shared data channel to determine if data is scheduled for it;
  provides channel quality and feedback information;
  performs neighbouring cell measurements and measurement reporting; and
  acquires system information.

The RRC_IDLE state can be thought of as a limited or low radio connection, and the RRC_CONNECTED state can be thought of as a full or high radio connection. The present disclosure is equally applicable to mobile telecommunications systems using these states within the 3GPP architecture and to other comparable limited states and full states defined within other telecommunications architectures and protocols. Accordingly, radio resource control states may be defined for the terminal to have a full connection or a limited connection with the local cell and/or a full connection or a limited connection with the base station. As used herein, a "full" connection or a terminal being "fully" connected with one of a mobile node or a base station refers to a radio resource control (e.g. RRC in 3GPP) state in which the terminal can (among other functions) exchange user data and signalling with the mobile node or base station. A "limited" connection refers to a radio resource control state in which the terminal remains connected to the mobile node or base station but cannot exchange user data with the mobile node or base station. For example, in a limited mode, the terminal may be configured to do one or more of: monitoring and receiving paging information, carrying out measurements, handling mobility (e.g. to another virtual cell or base station cell), and the like. Furthermore, in a limited mode the terminal may be able to receive data in a broadcast manner such as by MBMS (Multimedia Broadcast Multicast Services) or eMBMS (evolved MBMS).

In accordance with the present disclosure, various uses are made of the different connection states to facilitate efficient radio resource management in a virtual cell context, in which some of the functionalities of the base station can be transferred to a mobile node providing a local (virtual) cell. In a 3GPP environment this relies on different levels of RRC connectivity with the mobile node and with the base station.

A virtual cell arrangement of this type, and as further proposed herein, in which an RRC connection can be established between a VC-UE and a UE, may be of benefit in with the following situations, in particular in a 3GPP environment (although the same teachings could be transposed to a different environment):

A RRC signalling overhead reduction between the base station and UE. In conventional network architectures, the eNB is responsible for maintaining the RRC connections with all UEs within coverage, and the signalling overhead can be non-negligible in a UE-dense scenario. Furthermore, taking into account possible massive connections from IoT (Internet of Things) MTC (machine-type communications) devices with sensors to the eNB, the signalling overhead may cause critical issues on the current network architecture. In accordance with the present disclosure, a reduction in signalling may be attempted by selecting and activating one or more virtual cells within the base station cell, and allowing each virtual cell to manage the RRC connections with the UEs in that virtual cells. The base station no longer needs to maintain full RRC connections with every UEs individually and can instead maintain a limited or partial RRC connection with the UEs.

An improvement in spectrum efficiency and interference mitigation by supporting resource allocation within the virtual cells. Compared with resource allocation managed by a single node (base station), a distributed resource allocation scheme using one or more virtual cells can provide more flexibility and robustness. For example, through coordination with virtual cells in the network, the eNB may have a better control of the interference mitigation and resource management across the entire base station cell, and can control resources allocated to the VC with a view to reducing inter-virtual cell interferences. Owing to the (expected) lower transmission power of VCs, the same resources might be shared among different VCs to further improve the spectrum efficiency. It can be more straightforward to manage a smaller group of UEs (compared to the large of number of UEs that a base station is generally expected to manage), and this may be done with a relatively fine granularity of resources to allocate to UEs in a VC range. This can in turn be expected to reduce intra-virtual cell interferences (with a finer granularity in the resource allocation, the number of resource units that can be allocated is expected to increase such that the probability of users sharing the same resources will decrease). Accordingly, the mobile node (VC-UE) can beneficially manage resource allocation for the UEs in its local cell. The RRC connections may be managed by the mobile node to configure/re-configure the related physical control channels and data channels for example to receive resource allocation grants and data, respectively, as well as other configurations to support the resource allocation, such as Buffer Status Report (BSR) timers etc.

QoS differentiation. It is expected that, in future networks, QoS differentiation support will be an important aspect, both between users and between services for each individual user. With a RRC connection between the VC and the UE, the resource can be allocated by the mobile node (VC) for different QoS classes with a view to improving QoS and/or quality as perceived by the user. The virtual cell can then manage the corresponding radio bearers with the UE (e.g. to establish/maintain/release them) for mapping the logical channel configuration with the services. Owing to the RRC connection between the virtual cell and the UE, such a resource allocation management can be provided, if appropriate.

An improvement of spectrum efficiency and service continuity by supporting measurement report transmission. With a view to improving the local resource allocation by the virtual cell, the virtual cell may be made aware of the quality between virtual cell and its scheduling UE. The UE may then measure the channel quality with the mobile node providing the virtual cell and report this to virtual cell if being triggered (events can be defined for example if the link quality is too low, relatively lower than with another mobile node providing another virtual cell, relatively lower than with the base station, etc.). Using the RRC connection between virtual cell and the UE, the measurements can be configured and transmitted to the virtual cell in a measurement report.

While the local cells are expected to assist the base station, they are also expected to be of a more transient nature than a base station, and even more so if they are provided by a terminal which may be mobile, run out of battery, etc. In common with a eNB, however, the virtual cell needs to manage its RRC connections to UEs, and it may be desired to utilise conventional RRC procedures as much as possible. Note that in the present context, the virtual cell may be established on a UE, or a relay node with mobility.

From the foregoing it will be appreciated that it is necessary to consider how a virtual cell manages to set up, maintain and release the RRC connection with its UEs (RRC state management), and how or when the operation of the virtual cell may be activated and terminated. These issues are considered further herein.

In a situation where a cell experiences a high density of UEs, it may be desirable to improve the cell capacity. If UEs which are connected to the eNB are concentrated in some area within the cell, it is efficient to establish a virtual cell in that area in an on-demand manner in response to the concentrated demand so as to improve cell capacity temporarily. The virtual cell can be terminated when the concentration has dispersed. A known approach to improving cell capacity uses relay technology, but a relay as specified, for example, in 3GPP Release 10, is assumed to have a fixed location, and hence is not always conveniently placed to address a dynamic UE concentration.

Figure 3:
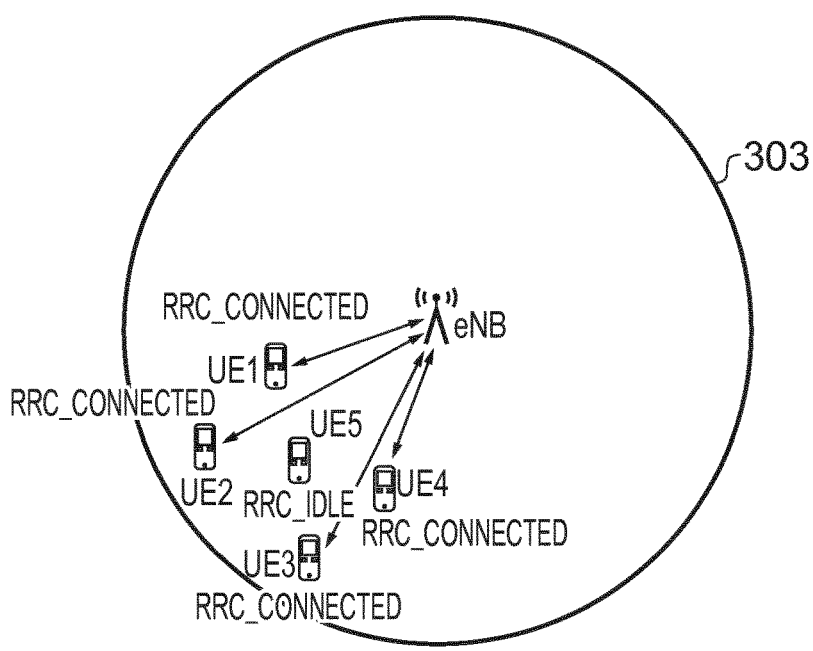
FIG. 3 shows a schematic representation of an example cell arrangement containing a hot spot.

FIG. 3 shows a schematic representation of a cell in which a virtual cell may be implemented. The cell 303 is served by an eNB (base station), and at the depicted moment, includes five UEs within its coverage. Four of theses, UE1-UE4, are connected to the eNB for data transfer (such as by a full RRC or RRC-like connection, designated herein as an RRC_CO-NNECTED state), and happen to be concentrated in a small area (relative to the size of the cell 303). This circumstance, in which data traffic is spatially concentrated, may be termed a "hot spot". The fifth terminal, UE5, is in the same area, but does not contribute to the hot spot since it is not RRC_CO-NNECTED to the eNB, but is rather in a idle state, not sending or receiving data. For simplicity, FIG. 3 shows an example which has only one hot spot in the coverage of the eNB, but in reality many hot spots may arise. Under such conditions, the eNB could face a lack of radio resources and an overload of signalling to the UEs in the cell. To address this, a virtual cell may be activated.

Figure 4:
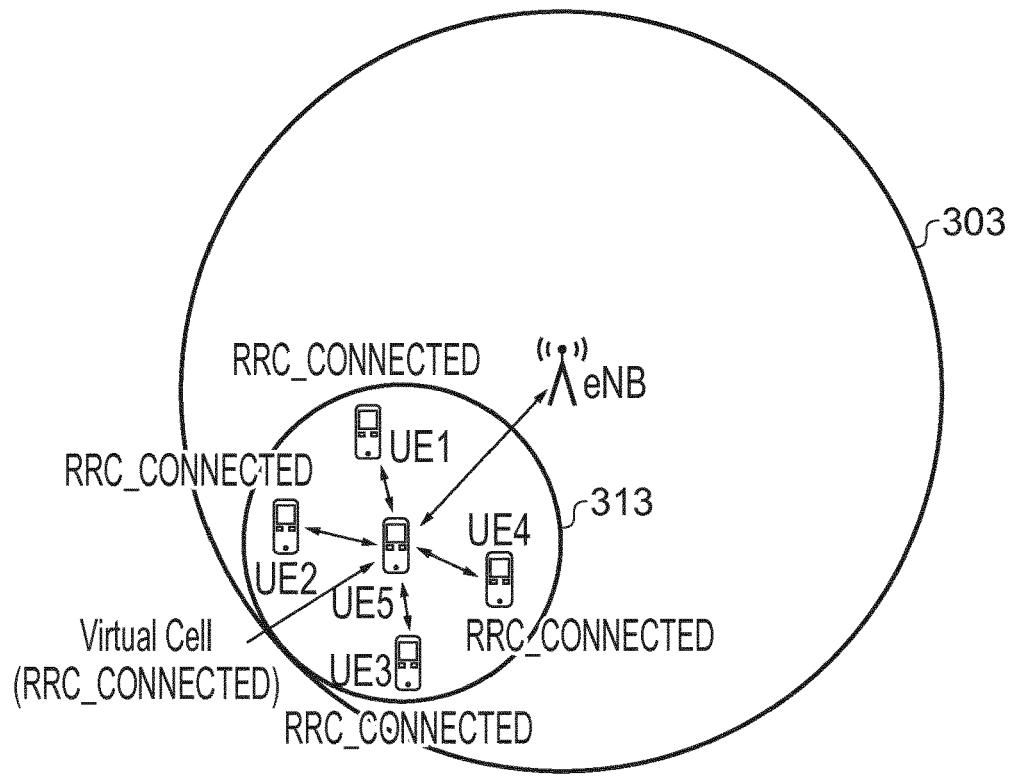
FIG. 4 shows a schematic representation of the example cell arrangement of FIG. 3 in which a local cell has been set up.

FIG. 4 shows a schematic representation of the cell 303 of FIG. 3 after a virtual cell has been established. The virtual cell is based on a UE which temporarily operates as base station in an on-demand manner, in response to the hot spot. The eNB recognises a hot spot, based on its buffer status, or as reported to it by the connected UEs, for example, and identifies a UE in the hot spot locality which is in an idle state (having a limited RRC or RRC-like connection, designated herein as RRC_IDLE). Note that if a UE is in an idle state but is involved in MBMS or eMBMS communication, it preferably should not be selected. In the present example, UE5 is a suitable candidate terminal. The eNB then indicates to UE5 (or another suitably located terminal in RRC_IDLE) that it should operate as a virtual cell. When the UE in RRC_IDLE is notified to operate as a virtual cell by the eNB, RRC connection is established between the eNB and the UE in RRC_IDLE, and the UE transitions from its RRC_IDLE state to be RRC_CONNECTED with the eNB since this is necessary for the terminal to host a virtual cell. An interface between the eNB and the virtual cell (UE5) is activated for operation of the virtual cell; this may be the Un interface for relay node operation specified by 3GPP Release 10, or a new format of virtual cell interface yet to be specified, or any other suitable past or current interface. After setting up the virtual cell operation, the eNB performs procedures to cause the UEs in the hot spot, UE1-UE4, to handover from the eNB to the virtual cell. The network may control some prioritization of UE handover so as to avoid an excessive number of simultaneous handovers. For example the network may give higher prioritization to UEs which are performing higher QoS communications, large data communication, or the like. The procedures may include RRC Connection Setup, RRC Connection Reconfiguration and RRC Connection Re-establishment messages to configure the UEs to send Measurement Report messages which include measurements of the link quality between the UEs and the virtual cell as well as that between the UEs and the eNB. Furthermore, this configuration of measurement may be defined by Measurement Objects, Reporting Configurations, Measurement Identities, Quantity Configurations and Measurement Gaps, and the virtual cell may be included in a list of candidate cells to be measured as Measurement Objects. In this context the Un interface could support protocol stacks for S1 interface and X2 interface, so that the virtual cell may exchange any information related to load balancing and interference with the eNB. Thereby, the virtual cell can be enabled to perform resource management and ICIC (Inter Cell Interference Coordination) or eICIC (enhanced ICIC) so as to maximize efficiency of usage of radio resources under the hot spot condition. After handover, the virtual cell 313 is established based on the UE5, which becomes a virtual cell UE (VC-UE), and the UEs which have been handed over to the VC-UE are in a RRC-CONNECTED state with the VC-UE and able to continue participation in data traffic previously enabled by the RRC connection to the eNB. So, each UE is RRC_CONNECTED with the VC-UE (VC_RRC_CONNECTED), and the VC-UE is RRC_CONNECTED with the eNB. Note that in the interests of conciseness, RRC or RRC-like connections with a mobile node or VC-UE are referred to herein as "VC_RRC", and RRC or RRC-like connections with the base station are referred to herein as "RRC". This should not be understood as referring to the RRC defined in the 3GPP only, but rather is equally applicable to corresponding radio resource control connections providing at least the same or similar functionalities. In one example, the functionalities available in the VC_RRC_IDLE and VC_RRC_CON-NECTED states are defined as follows:

VC_RRC_IDLE
    Sleeping mode management for energy saving/DRX management
    VC specific system information acquisition (if any)
    measurements configuration from the VC
    paging channel—if any—monitoring VC_RRC_CONNECTED
    Data transfer between UE and VC
    Energy saving mode/DRX management
    Mobility control, handover to another VC or fallback to network
    paging channel—if any—monitoring
    VC specific system information acquisition (if any)
    Monitoring of the VC's specific control channel and data channel to send/receive data
    Perform measurement if configured by the VC
    Provide channel state information for the VC and feedback if necessary The initial condition of VC_RRC_CONNECTED UEs throughout the virtual cell preferably should not and possibly cannot be maintained indefinitely. The VC-UE and the UEs are all mobile and have finite power available to them so the connection states and configuration shown in FIG. 4 may become impractical. Therefore, it is proposed that a UE which has RRC connection to the virtual cell will transition to be in RRC_IDLE after it has finished transmission or reception of data to or from the virtual cell to save power consumption. This is similar to usual procedures outside of a virtual cell in which a UE not engaged in data traffic keeps an RRC_IDLE connection to a eNB. Furthermore, since the virtual cell is set up to improve cell capacity under a hot spot condition, if or when the hot spot condition ceases (the concentration of RRC-CONNECTED UEs has dispersed or switched to RRC_IDLE), the virtual cell will have fewer UEs in VC_RRC_CONNECTED. This may be wasteful of radio resources for reference signals and the like, and if resources are pooled for the virtual cell in collaboration with the eNB, the eNB may have limited access to radio resources which are no longer needed by the virtual cell. To address this, the virtual cell may stop operating, for example by the VC-UE turning back to be a regular UE in RRC_IDLE with the eNB. Example procedures for implementing these transitions are discussed further below.

Figure 5:
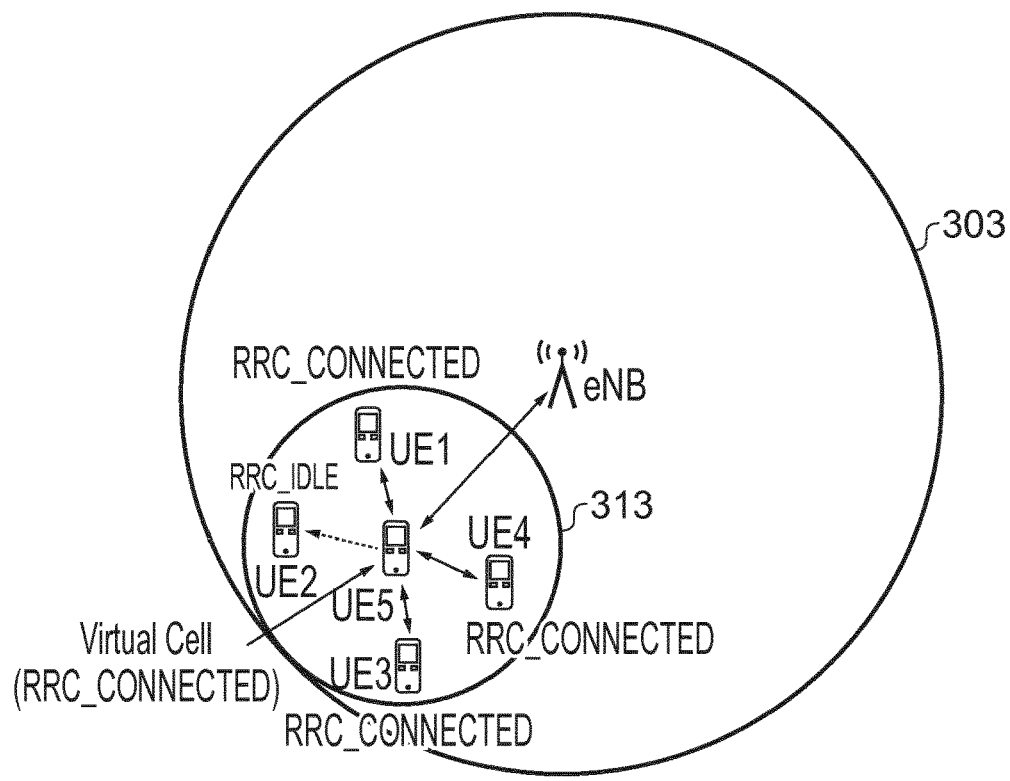
FIG. 5 shows a schematic representation of the example cell and local cell of FIG. 4 at a later time.

FIG. 5 shows a schematic representation of the cell 303 and virtual cell 313 after a first UE has completed its current data transfer. In this example UE2 has finished a transmission/reception of data to/from the virtual cell 313, and has switched to be in RRC_IDLE so to reduce power consumption. However, taking into account that UE2 may need to recommence transmission/reception of data to/from the virtual cell at short notice, UE2 has its RRC_IDLE state with respect to the virtual cell (i.e. VC_RRC_IDLE, represented by a dotted line). Under this state, the virtual cell can send RRC Connection Release messages to UE2 and perform a UE Context Release procedure with a MME (mobility management entity) in the same or similar manner as a conventional eNB or relay node do. If UE2 then requires to engage in data traffic again, from the VC_RRC_IDLE state it requests an RRC connection to the virtual cell, and is enabled to transition back to VC_RRC_CONNECTED and start transmission/reception of data to/from the virtual cell, reverting to the system as depicted in FIG. 4.

Figure 6:
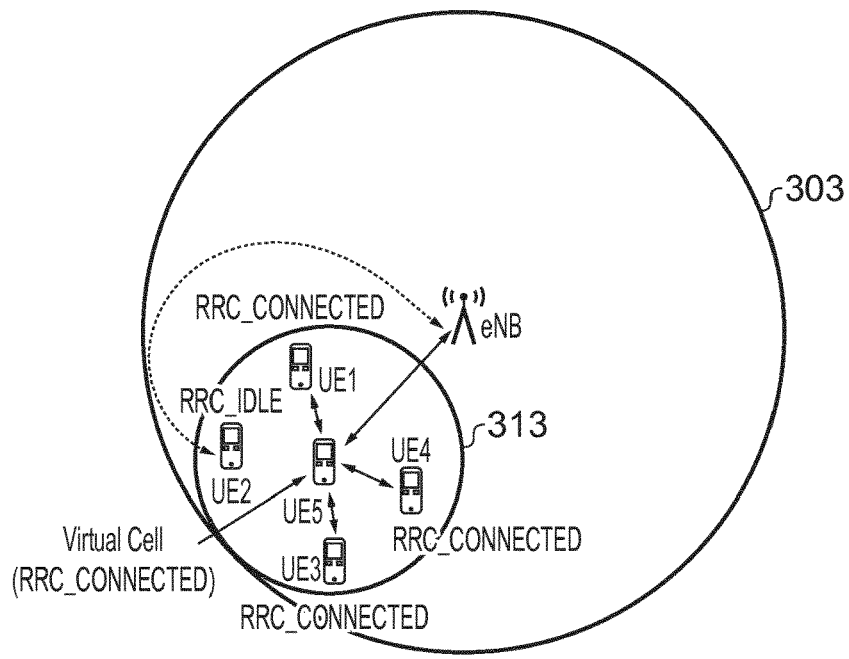
FIG. 6 shows a schematic representation of the example cell and local cell of FIG. 4 at a still later time.

However, in the event that no further data traffic is required by UE2 or another UE in the virtual cell that is sitting in VC_RRC_IDLE, the UE may remain in VC_RRC_IDLE for a relatively long time. If this occurs, the UE faces an increased possibility of losing the virtual cell, since the VC-UE is mobile and may move such that the UE is outside coverage of the virtual cell. The virtual cell will then not be available if data transfer becomes necessary. To address this, it is proposed that the UE switches from VC_RRC_IDLE, i.e. an idle state with the VC_UE, to RRC_IDLE, i.e. an idle state with the eNB. The UE thus ceases to be included in the virtual cell and instead can rely on the eNB for a next data transfer. FIG. 6 shows a schematic representation of the cell 303 after this transition has been made. UE2 no longer has any connectivity with the virtual cell, and instead has a RRC_IDLE connection with the eNB, indicated by the dotted line.

Figure 7:
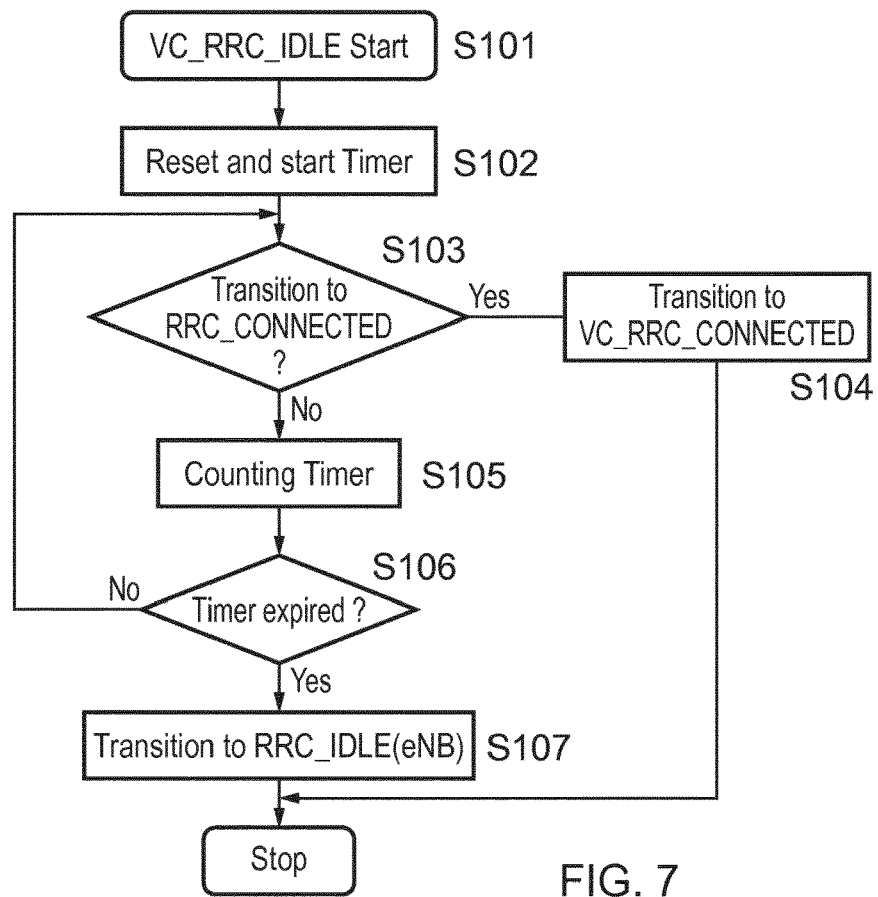
FIG. 7 shows a flow chart of steps in an example method for managing radio connections of a terminal in a local cell.

FIG. 7 shows a flow chart of steps in an example method for implementing this transition for a UE within a virtual cell. After termination of the initial VC_RRC_CONNECTED state, a UE enters the VC_RRC_IDLE state (S101). Also, a timer is reset and started counting (S102). This is a timer for VC_RRC_IDLE operation, and may be maintained by the UE or by the VC-UE. The timer has a particular duration, and this duration may be predetermined (fixed and set in advance, such as during manufacture or maintenance/upgrading of the UE or VC_UE), or configured on demand by the virtual cell, for example based on a size of coverage of the virtual cell (which depends on the output power of the VC_UE) and/or the buffer status of the virtual cell or the eNB at the time. The timer may be started simultaneously with entry into the VC_RRC_IDLE state, or after entry in the VC_RRC_IDLE, for example a fixed time afterwards. The fixed time may be a short time, for example less than 30 seconds or less than one minute, or a longer time, such as more than one minute. Next, the UE judges whether it needs to perform a transition from VC_RRC_IDLE to VC_RRC_CONNECTED, for example if data transfer is required (S103). If yes (a full connection is required), the UE makes the transition to the VC_RRC_CONNECTED state (S104) and stops the VC_RRC_IDLE state. Also, the timer is stopped and the method ends. If the judgement in step S103 is no (a full connection not required), the UE keeps counting the timer (S105). Then a judgement is made as to whether the timer has expired (S106). If no, the UE returns to step S103 and the procedure continues as before. If the timer is found to have expired in step S106 (the timer duration has been met), the UE makes a transition to an RRC_IDLE state with the eNB (S107), and leaves its VC_RRC_IDLE state, and the method stops. The finishing of the idle (limited) radio state with the VC_UE and the starting of the idle (limited) state with the eNB may be performed simultaneously or sequentially. If sequentially, either action may occur first, but if the RRC_IDLE state to the eNB is activated before the VC_RRC_IDLE state is terminated, a radio connection is maintained at all times. If desired, the UE may perform a cell reselection procedure prior to executing S107, in which it decides which eNB (or possibly a VC-UE if there is an alternative virtual cell nearby) to connect with. This cell reselection may be performed after excluding the current virtual cell from a list of candidate cells or adding the current virtual cell to a list of blacklisted cells, so as to avoid reconnection to the current virtual cell. The method may be configured such that one or both of the judgement steps S103 and S106 are performed only at specific time intervals (i.e. at a predetermined frequency) to reduce processing overhead in execution of the method.

Figure 8:
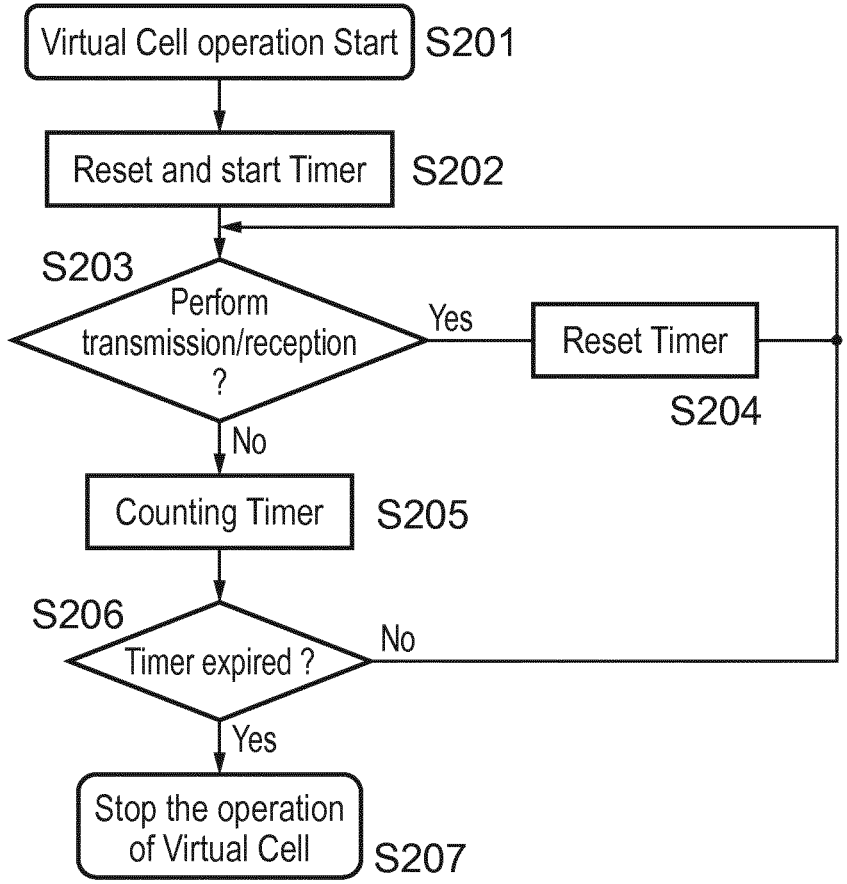
FIG. 8 shows a flow chart of steps in an example method for managing the lifetime of a local cell.

A second timer may be utilised to manage the lifetime of the virtual cell. This may be in conjunction with or separately from the use of a first timer for VC_RRC_IDLE operation for one or more UEs in the virtual cell. FIG. 8 shows a flow chart of steps in an example method for controlling start and stop times for operation of a virtual cell. Firstly, a UE (such as UE5 in FIG. 3) starts operation of a virtual cell (S201). Then the virtual cell resets a timer to t=0 and starts the timer (S202). The timer is for virtual cell operation and may be maintained by the VC-UE or the eNB. The timer has a defined duration, which may be predetermined (fixed and set in advance, such as during fabrication, maintenance or upgrading of the VC-UE or the eNB), or configured on demand by the eNB, for example based on a size of coverage of the virtual cell (which depends on the output power of the VC-UE) and/or the buffer status of the virtual cell or the eNB at the time. The timer may be started simultaneously with the commencement of virtual cell operation, or after virtual cell commencement, for example a fixed time afterwards. The fixed time may be a short time, for example less than 30 seconds or less than one minute, or a longer time, such as more than one minute In a next step S203, while the timer is running, the virtual cell makes a judgement about whether it has performed, handled or managed any data transmission or reception since the timer was started. If the answer is yes (transmission or reception has occurred), the virtual cell resets and restarts the timer (S204) and return to decision step S203. On the other hand, if no transmission or reception has happened so that the judgement answer in S203 is no, the virtual cell keeps counting (running) the timer (S205). Subsequently, the virtual cell judges whether the timer has expired or not (S206), i.e. if the timer has run for its full duration. If no (the timer is still running), the method returns to step S203 for further judgement about data activity. If yes at S206 (the timer has expired), the virtual cell operation is terminated, by stopping operation of the VC-UE as a virtual cell hub, and returning it to standard operation as a UE (S207). For example, this could be a state of RRC_IDLE of the UE to the eNB. The method may be configured such that one or both of the judgement steps S203 and S206 are performed only at specific time intervals (i.e. at a predetermined frequency) to reduce processing overhead in execution of the method.

Upon closure of the virtual cell, it may occur that one or more UEs in the virtual cell are in a VC_RRC_IDLE state with the VC-UE. This can be addressed by configuring the timer for virtual cell operation (second timer) to have a duration equal or longer than the duration of the timer for VC_RRC_IDLE operation (first timer). Under this arrangement, all UEs in VC_RRC_IDLE under the virtual cell will have already made the transition to RRC_IDLE to the eNB before operation of the virtual cell is terminated. If the UEs in the virtual cell are able to have different durations of first timer (for example, if the timers are set on demand in response to a parameter that might alter over time, such as buffer status), a maximum allowable first timer duration can be established, and the second timer duration set to be equal to or longer than the maximum first timer duration. According to this procedure, a VC-UE that has been established in an on-demand manner in response to a concentration in demand can be efficiently released once the hot-spot condition is resolved.

Figure 9:
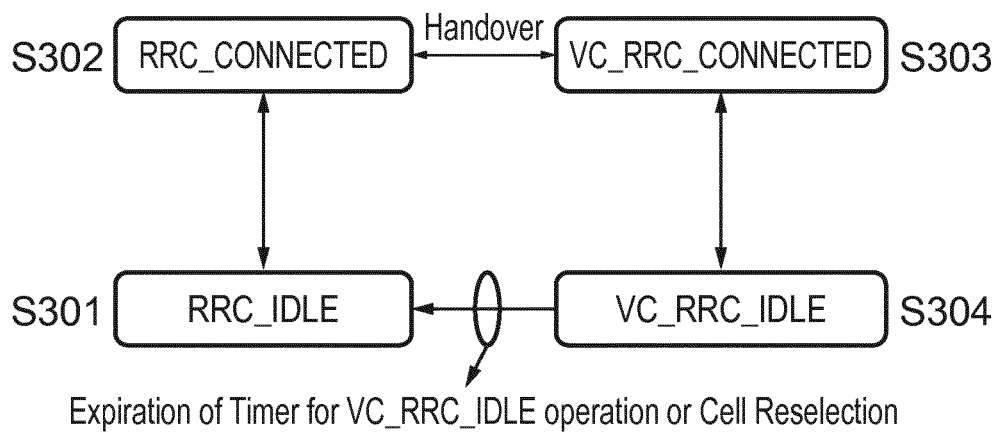
FIG. 9 schematically depicts example radio state transitions of a terminal in a cell and a local cell.

FIG. 9 is a schematic representation of possible state transitions for a UE operating in a cell and a virtual cell. Arrows connecting the various states indicate allowable directions of transition. A UE may initially be in an RRC_IDLE state to a eNB (S301). The UE may request a full RRC connection to the eNB (for example if a need for data traffic arises), so that the UE turns to be in RRC_CONNECTED with the eNB (S302). Whilst it is in RRC_CONNECTED, it may contribute to a hot spot that causes the eNB to set up a virtual cell based on an idle UE in or near the hot spot area. The eNB may then request the UE to handover to the virtual cell, so that the UE performs a handover procedure to join the Virtual Cell and transitions to be in VC_RRC_CONNECTED (S303). Here, the eNB may configure measurement reporting by the UE (such as by RRC_Connection_Configuration messaging) for use in a decision procedure for handover from the virtual cell (which is discussed further below). Following this, the UE in VC_RRC_CONNECTED might need to handover back to the eNB (revert to RRC_CONNECTED), for example due moving outside the virtual cell coverage (S302). Alternatively, while in VC_RRC_CONNECTED if the UE finishes transmission or reception of data with the virtual cell, the UE turns to be in VC_RRC_IDLE (S304), equivalent to the conventional RRC management procedure of the eNB (from S302 to S301). Then while in VC_RRC_IDLE, if the UE does not request an RRC connection to the virtual cell to perform transmission/reception of data to/from the virtual cell (from s304 to S303) for the predetermined or configured duration of the first timer (following the method of FIG. 7), the UE transitions to be in RRC_IDLE to the eNB (S301). The state transition from S304 to S301 can also take place if the UE moves out of coverage of the virtual cell while in VC_RRC_IDLE. A possibility of failure of the link between the UE and the virtual cell caused by mobility of the virtual cell while the UE is in VC_RRC_IDLE (so that the VC_UE and/or the eNB may no longer be able to track the presence of the UE inside the VC-UE coverage) can be addressed by limiting a duration of the VC_RRC_IDLE state, such as by using the first timer described above.

The tasks which a UE may basically perform during the VC_RRC_IDLE and VC_RRC_CONNECTED states may be the same as or similar to those which the UE performs during RRC_IDLE and RRC_CONNECTED states (as defined for example in the current 3GPP Technical Specification document [2]). In other words, operation of the UE within a virtual cell can be substantially the same as its operation within a base station cell.

Figure 10:
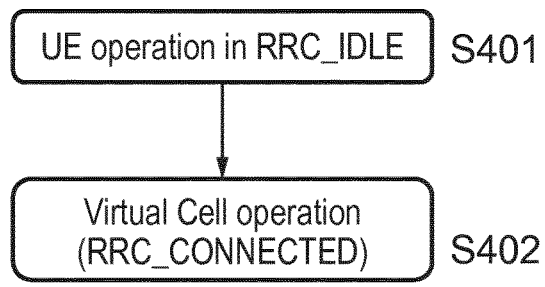
FIG. 10 schematically depicts example operational transitions of a terminal in a cell.

FIG. 10 is a schematic representation of possible state transitions for a UE configured to operate on demand as a VC-UE to establish a virtual cell. Note that a UE which supports the functionality of operating a virtual cell should also support the state transitions shown in FIG. 9, for times when it is operating as a standard UE and not as a VC_UE.

A UE is initially in RRC_IDLE to a eNB and operating as a UE (S401). If the eNB requests the UE to operate as virtual cell (for example in response to a hot spot arising in the vicinity of the UE), the UE triggers appropriate procedures for virtual cell operation. These procedures include the establishment of RRC connection to the eNB at least (RRC__CONNECTED). At the same time or after establishment of RRC connection to the eNB, the UE may activate virtual cell functionality implemented in it or configured by the network, and establish the required interface between the virtual cell and the eNB. As mentioned earlier this interface may be the Un interface specified for relay node operation in 3GPP Release 10, or any known or new interface for virtual cell operation that might be developed in the future. As a result of these actions, the UE transitions to be in the virtual cell operation state (S402). This state should be RRC_CONNECTED from the perspective of the eNB. Once in virtual cell operation, the VC-UE may make the transition back to UE operation in RRC_IDLE (S401) due to mobility (movement out of range of the UEs or the eNB), condition of data traffic in the eNB's cell (dispersal of the UEs forming a hot spot, for example) and so on, as described above. Before making the transition back to a regular UE, the virtual cell may perform handover procedure for UEs belonging to it so that those UEs can handover to another virtual cell or the eNB.

We can also consider the possibility that concentration of data traffic in a hot spot may be periodic to some extent. For example, the hot spot condition may re-occur relatively quickly after the virtual cell has ceased operation. In this context it may be useful, before the VC-UE transitions from RRC_CONNECTED (S402) to RRC_IDLE (S401), for a eDRX (extended Discontinuous Reception) connection to be configured between the eNB and the VC-UE. The eDRX connection may be configured by the eNB or by the VC-UE. This can avoid a need for repeated reactivation of the VC-UE in response to repeated hotspot conditions, and save power consumption of the VC-UE. It is proposed that the VC-UE uses the eDRX operation to keep the RRC_CONNECTED state to the eNB. The VC-UE need not then have to configure eDRX to an access link whenever a UE requests a connection set-up to the virtual cell. If the VC-UE receives a connection set-up request from a UE while in the eDRX condition, the VC-UE can release the eDRX operation of the link between the VC_UE and the eNB together with the eNB. Also, the VC-UE can reset and start a timer when the eDRX is established. The timer has a defined duration, which may be predetermined (fixed and set in advance, such as during fabrication, maintenance or upgrading of the VC-UE or the eNB), or configured on demand by the eNB, for example based on a size of coverage of the virtual cell (which depends on the output power of the VC-UE) and/or the historical behaviour of data traffic or the eNB up to that time. For example, an average value of data traffic via the VC-UE in downlink and/or uplink over time might be used to define the historical behaviour. When this timer for the eDRX operation expires, the transition of the VC-UE from RRC_CONNECTED (S402) to RRC_IDLE (S401) can finally be performed.

Figure 11:
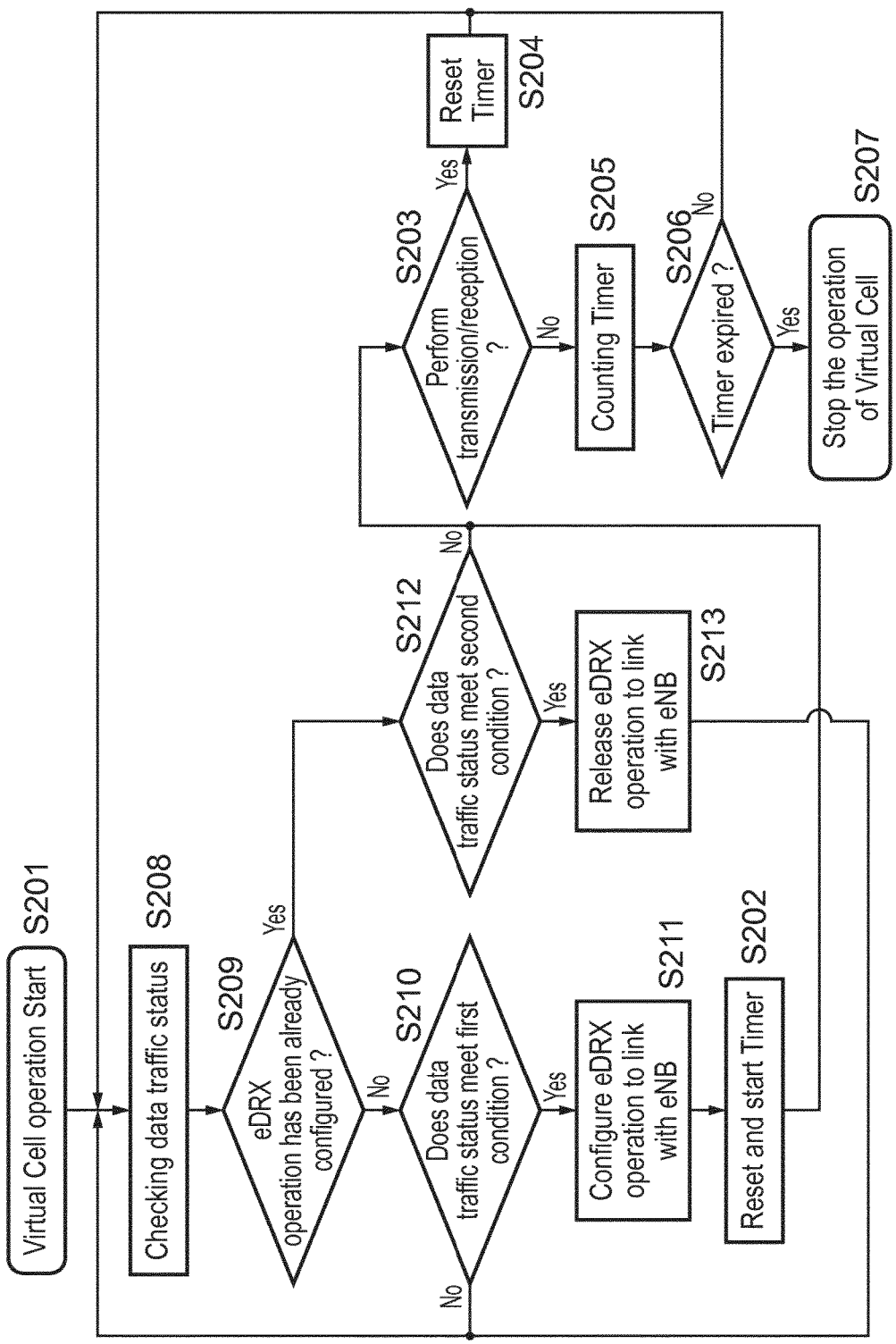
FIG. 11 shows a flow chart of steps in an example method for operating a local cell.

FIG. 11 shows a flow chart of steps in an example of such a procedure, which in this case is implemented in conjunction with the virtual cell timer operation method illustrated in FIG. 8. Steps which are the same as those in FIG. 8 have the same numbers, and the description of them is not repeated here. The additional steps relating to the eDRX operation procedure appear as steps S208 to S213 which are implemented before step S202 or S203 from the FIG. 8 procedure. In this example, the timer used for the virtual cell operation already described above is also employed as the eDRX operation timer. After starting operation of the virtual cell in step S201, the method proceeds to step S208 where the status of data traffic in the hot spot area, corresponding to the virtual cell area, is checked. Following this, in step S209, a judgement check is made as to whether eDRX operation has already been configured (for example during a previous loop of the FIG. 11 method)_If it has not, the result of the data traffic status check from step S208 is then judged in judgement step S210, where the method determines if the amount of data traffic meets a first condition which tests if the virtual cell should enter the eDRX mode. If the level of data traffic is high, for example above a predetermined threshold which can be set according to network requirements, there is considered to be no need for eDRX operation, so the first condition is not met, and the method loops back to step S208 for further monitoring of the data traffic status. On the other hand, if the level of data traffic is low so that it falls below the threshold, the first condition is met in step S210. The method then moves to step S211 in which eDRX operation is configured for the link of the VC-UE with the eNB. Subsequent to the configuration of the eDRX operation in step S211, the method proceeds to step S202 in which the VC-UE resets and starts the timer before the method moves to step S203 previously described with respect to FIG. 8. If in the test in step S209 it is found that the eDRX operation has already been configured, the method proceeds to step S212 where a further judgement of the data traffic status is made, this time against a second condition. The second condition tests whether it is appropriate for the eDRX mode to be released. If it is found that the level of data traffic is high, for example, above a predetermined threshold which can be set according to network requirements, the second condition is met. Hence, it is deemed that eDRX mode is no longer required, and the method moves to step S213 in which the VC-UE releases eDRX operation of its link with the eNB. Then, the method returns to step S208 for continued checking of the data traffic. Conversely, if it is found in step S212 that the second condition is not met, because the data traffic level is below the threshold, continued eDRX operation is appropriate, and the VC-UE continues in this state to follow the method to step S203, previously described for FIG. 8. There is no need to start the timer via the step S202 because it will be already running from a previous loop of the method in which the existing eDRX operation was configured. Hence, following any of the paths through steps S208 to S213, the method then proceeds as already described with regard to FIG. 8. Virtual cell operation is stopped if the timer expires, and if the timer is still running the virtual cell remains operational and continues monitoring for data transmission or reception (step S203, counting the timer (step S205) and checking the data traffic status (step S208). If data transmission or reception is found to have occurred in step S203, the timer is reset in step S204 and the method returns to step S208 to monitor the data traffic. This also happens if there has been no transmission or reception but the timer has not yet expired in step S206.

In this procedure, the first condition in step S210 and the second condition in step S212 might be the same (the same threshold for data traffic level, for example). However, possible ping-pong operation of the eDRX link may occur in this case, so it may be appropriate to configure the conditions to be different (different thresholds, for example).

According to the FIG. 11 procedure, the VC-UE or the network can activate eDRX operation depending on the data traffic condition so as to use radio resources for backhauling efficiently as much as possible. For example, multiple VC-UEs may share radio resources for backhauling among themselves in a time-sharing manner by setting eDRX operation at different offsets (drxStartOffset) and/or durations (OnDuration periods).

As described herein, a VC-UE is in essence a UE that is also able to simultaneously provide the function of a relay node between the eNB and a number of UEs. To achieve this, a suitable interface is activated between the eNB and the VC-UE, which may be, for example, the Un interface for replay node operation specified by 3GPP Release 10. This specification ("3GPP TS 36.300:4.7 Support for relaying" [3]) includes the assumption that the relay node has a subset of UE functionality, but does not support an inter-cell handover procedure that can be required when network components have mobility. A relay node is stationary, so there is no need to consider procedures related to mobility such as reporting measurements of link quality between the relay node and its eNB (donor eNB). Once the relay node functions are given to a UE for VC-UE operation, however, mobility issues become relevant and one should consider the need to perform mobility management procedures. For example, since under Release 10 a relay node can have a subset of UE functionality, the procedure of a UE reporting measurements of link quality (Measurement Report messages) might be adapted to make the relay node specification more suitable for a VC-UE having mobility.

A need for handover of a device (UE or VC-UE) can arise when that device is no longer within the coverage area of the cell in which it has been operating. In the context of a virtual cell, two handover situations should be considered because both the UE and VC-UE have mobility. The UE may move out of range of the VC-UE, and need to handover to the eNB (or a different eNB) or to a different virtual cell. The VC-UE may move out of range of the eNB. It will then need to handover to another eNB (or possibly to a different virtual cell if its virtual cell hosting has been terminated). The virtual cell functionality it has been providing will cease, and UEs in the virtual cell will also need to handover, to the eNB or a different virtual cell. It may be considered that handover of the UE could be managed by the virtual cell, and handover of the virtual cell could be managed by the eNB. However, the mobility of the VC-UE and the mobility of any UE belonging to it can be dependent on each other, or independent of each other. Hence, it is useful if handovers managed by virtual cells and handovers managed by base stations are not necessarily handled independently. Issues arising from this are now considered.

The handover procedures are proposed to be managed by, for example, utilising the Measurement Report messaging procedure. Under RRC protocols, a device such as a UE can monitor or measure the quality of radio communication links between itself and other network components, and can be configured or activated to send Measurement Report messages which include these link quality measurements. The Measurement Report is sent in the uplink direction, from the device to the component providing its cell. In the present context, a UE may be configured to report to the virtual cell, and the virtual cell may be configured to report to the eNB. Conventionally, measurement reporting is arranged to be triggered in response to one or more events regarding link quality. The link quality reported in this way can be used to determine any need for handover. This should not be considered as limited to an LTE or other 3GPP environment using RRC; examples described herein based on Measurement Reporting may utilise any link quality measurement procedure.

Figure 12:
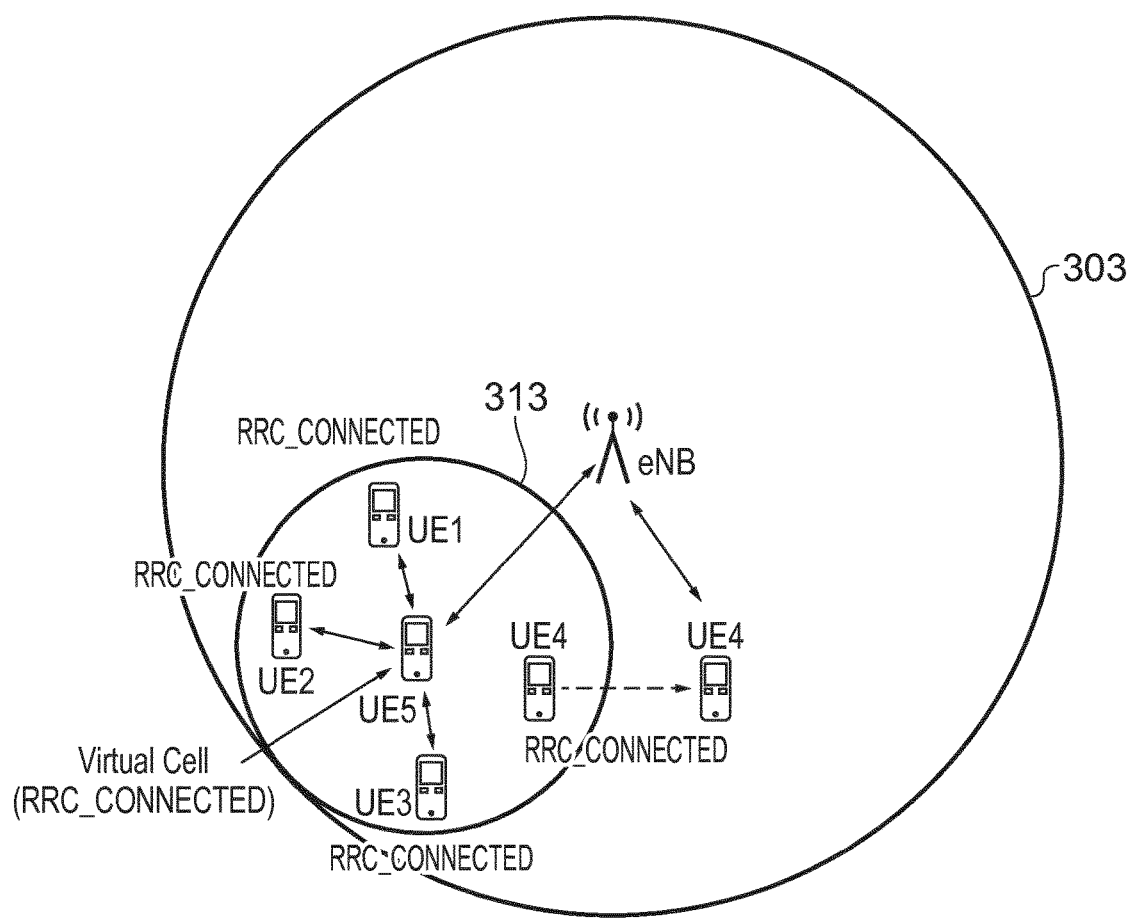
FIG. 12 shows a schematic representation of the example cell and local cell of FIG. 4 after movement of a user equipment.

FIG. 12 shows a schematic representation of the cell 303 from FIG. 4 following motion of a UE. In the example the UE4 has mobility and moves out of the coverage of the virtual cell 313, as indicated by the dotted arrow. In such circumstances, if the UE4 has been sending Measurement Report messages including measurements of the quality of the radio communication link between itself and the VC-UE and itself and the eNB, the virtual cell can determine, based on the reported quality, whether the UE4 needs to handover to the eNB or to another virtual cell (not shown). If handover is deemed necessary, the VC-UE can initiate a handover procedure. FIG. 12 shows that the UE4 has been handed over to the eNB and is now RRC-CONNECTED thereto, and no longer connected to the virtual cell.

Figure 13:
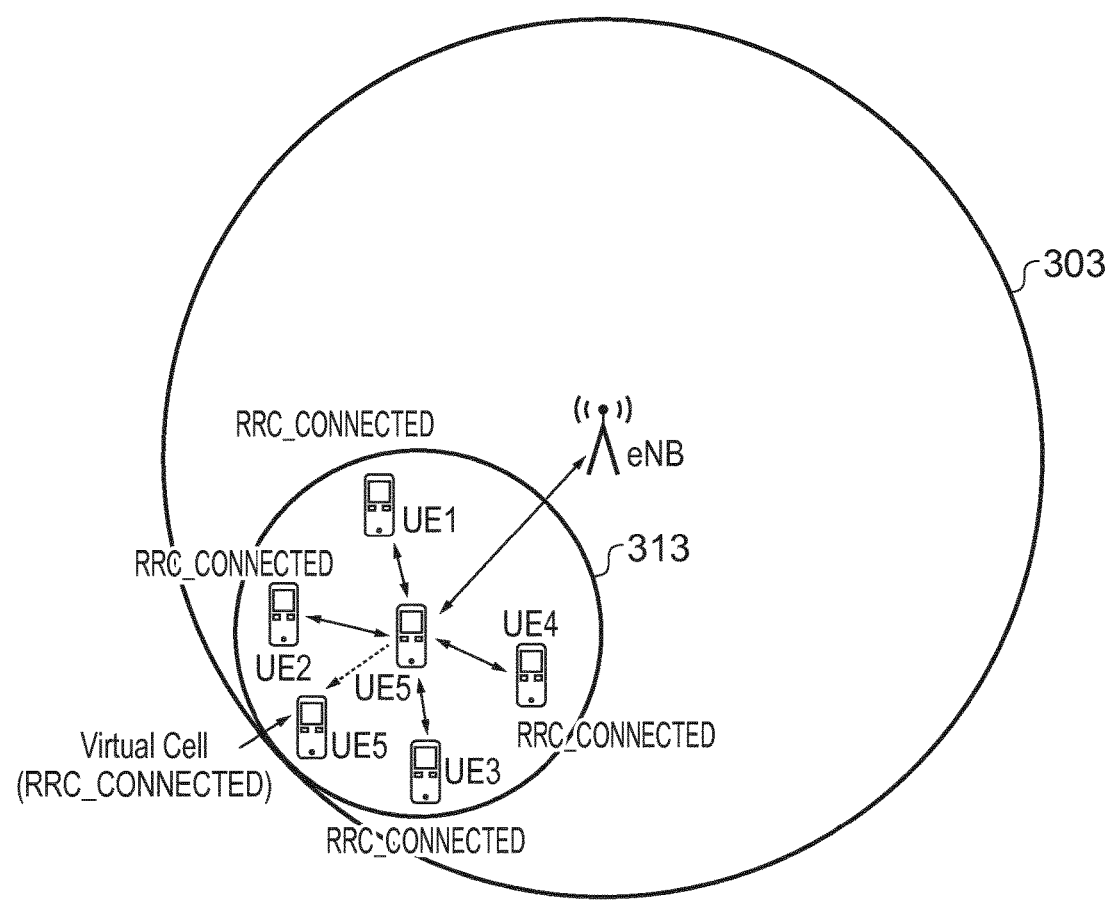
FIG. 13 shows a schematic representation of the example cell and local cell of FIG. 4 after movement of the virtual cell user equipment.

FIG. 13 shows a schematic representation of the cell 303 from FIG. 4 following movement of the UE5 which is providing the virtual cell 313. In this example, the UE5 has moved further from the eNB, as indicated by the dotted arrow. It is now near the edge of the cell 303, and may experience poor radio communication link quality with the eNB. This may make continued operation of the virtual cell unsustainable. Two handover situations thereby arise. Firstly, the UE5 operating the virtual cell may need to handover if the link quality between the eNB and the virtual cell becomes too low. This is Handover Case 1. Secondly, the UEs camping in the virtual cell 313 (UE1-UE4) may need to handover from the virtual cell to the eNB or to another virtual cell (which might be already in operation or might be newly activated by the eNB or another eNB in response to demand). This is Handover Case 2.

In Handover Case 1, the eNB may judge whether handover of the virtual cell is necessary or not, based on the link quality reported by the VC-UE to the eNB. In Handover Case 2, it may be more appropriate for the handover requirement to be judged by the virtual cell, based on the link quality between each UE and the virtual cell (and perhaps also each UE and the eNB) as reported to it by each UE, and also on the link quality between the virtual cell and the eNB.

Handover Case 1 may be managed by adaption of the conventional event triggered measurement reporting procedure between a base station and a UE so that it applies instead to the eNB and the VC-UE. The VC-UE is triggered to send Measurement Reports to the eNB by an event related to the measured link quality, and based on the reported link quality, the eNB determines if the VC-UE needs to be handed over. For Handover Case 2, however, measurement reporting of the link quality between the UE and the virtual cell and between the UE and the eNB, which are both measured by the UE, should be triggered on and off by the link quality between the virtual cell and the eNB. In other words, if the VC-UE moves away from the eNB so that the quality of the link between them drops, the UE can be triggered to measure and report its own link quality since this may deteriorate because the VC-UE can no longer sustain the virtual cell.

According to the current specification 3GPP TS 36.331, various events are specified for triggering measurement reporting, and can be applied to a UE and to a UE acting as a virtual cell. However, none of these triggers covers the situation according to Handover Case 2. To accommodate this, an additional event might be added, defined for example as "eNB becomes worse than threshold", i.e. the link quality between the eNB and the VC-UE falls below a pre-set threshold level. This information will not be automatically evident to the UE in the virtual cell, however, so when this event occurs, the VC-UE can configure the UE to begin measurement reporting to the virtual cell. If the link quality then reported from the UE to the VC-UE falls below a threshold, the VC-UE can judge that a handover of the UE to the eNB or another virtual cell is necessary.

Figure 14:
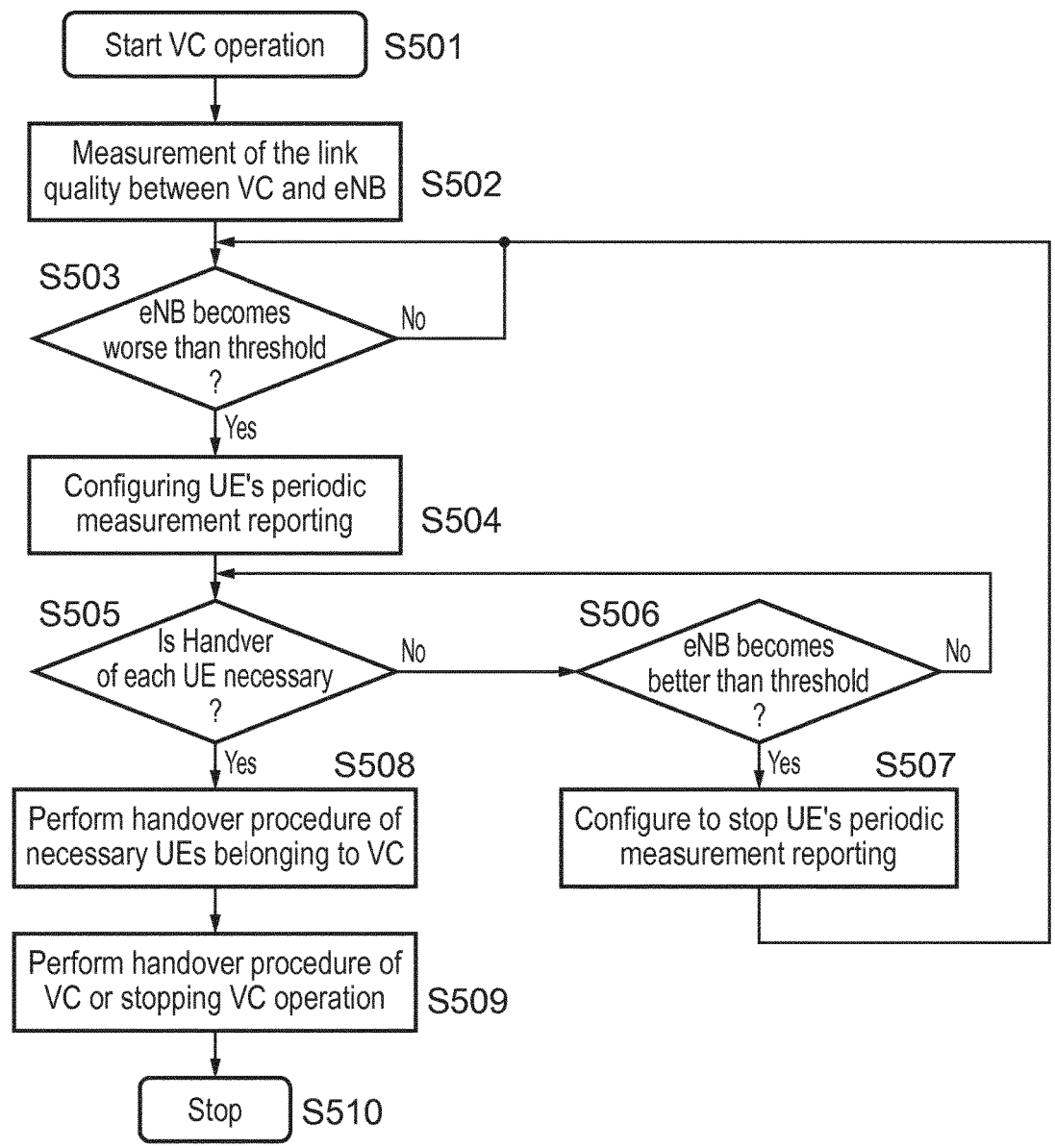
FIG. 14 shows a flow chart of steps in an example method for managing mobility in a virtual cell context.

FIG. 14 shows a flow chart of steps in an example procedure for managing mobility in such a way. Starting at step S501, a UE, such as UE5 in FIG. 4, starts operation to provide a virtual cell. During virtual cell operation, the virtual cell performs configured periodic measurements of the link quality between itself and the eNB (S502). These measurements can be reported to the eNB. Passing to decision S503, the virtual cell judges whether or not the quality of this link to the eNB falls below a threshold (which can be set to any convenient value). If the link quality remains at or above the threshold, the method returns to S503 for further judgements at intervals. If the link quality falls below the threshold in the S503 judgement, the virtual cell configures periodic measurement reporting of the UEs belonging to it (S504). In response, each UE begins to report to the virtual cell the link quality of the link between itself and the virtual cell. It may also report the quality of the link between itself and the eNB. Passing to decision S505, the virtual cell judges, for each UE, whether a handover of the UE is necessary. This can arise if, for example, the link quality between the UE and the virtual cell falls below a threshold, or becomes worse than the link quality between the UE and the eNB. If a handover is deemed necessary, the procedure passes to S508 wherein the virtual cell performs steps required to handover the UE from the virtual cell to the eNB or another virtual cell. Once all of the UEs have been handed over in S508, and because the link between the virtual cell and the eNB judged in S503 is still considered below threshold, the eNB judges that the virtual cell cannot be sustained and initiates either that the UE providing the virtual cell is handed over to another eNB or that the UE stops its virtual cell operation (S510).

However, in decision S505 if the virtual cell does not find that it is necessary to handover any UEs, the procedure passes to a further decision at S506, where it is judged whether the link between the virtual cell and eNB has improved and is now back above the threshold (being the threshold previously used in S503). This may be the reason for the UEs not requiring handover, for example—the virtual cell has a better connection itself so is able to provide better links to the UEs. If the threshold is not exceeded in S506, the method returns to S506 for further judging of the need for UE handover. On the other hand, if it is found at S506 that the link quality between the virtual cell and the eNB is above the threshold, at S507 the virtual cell configures the UEs to stop the periodic reporting of their link qualities (since this no longer serves any purpose because the virtual cell is again based on a good link and stable operation can be expected).

The method then loops back to S503 for a further check on the virtual cell-to-eNB link quality.

In this way, the various connections required for sustained quality operation of the virtual cell can be monitored in an efficient manner, and appropriate handovers undertaken if the radio connections deteriorate.

Note that the above procedure for mobility management, or modifications thereof, may be implemented in conjunction with timer-based operation of the virtual cell for example as in FIGS. 7 and/or 8, or separately therefrom, according to any performance and operation requirements of a network.

The present disclosure relates to RRC connection management between a virtual cell and one or more UEs. With the proposed examples, cell capacity can be flexibly adapted at hot spot areas in an on-demand manner. In addition, efficiency of usage of radio resources which may be commonly used by an eNB and a virtual cell can be enhanced.

Various procedures have been described above and the skilled person will understand that the teachings provided herein, generally in the context of existing RRC procedures or of RRC-like procedures, can be equally applied to other radio control procedures, states and state transitions as appropriate.

Figure 15:
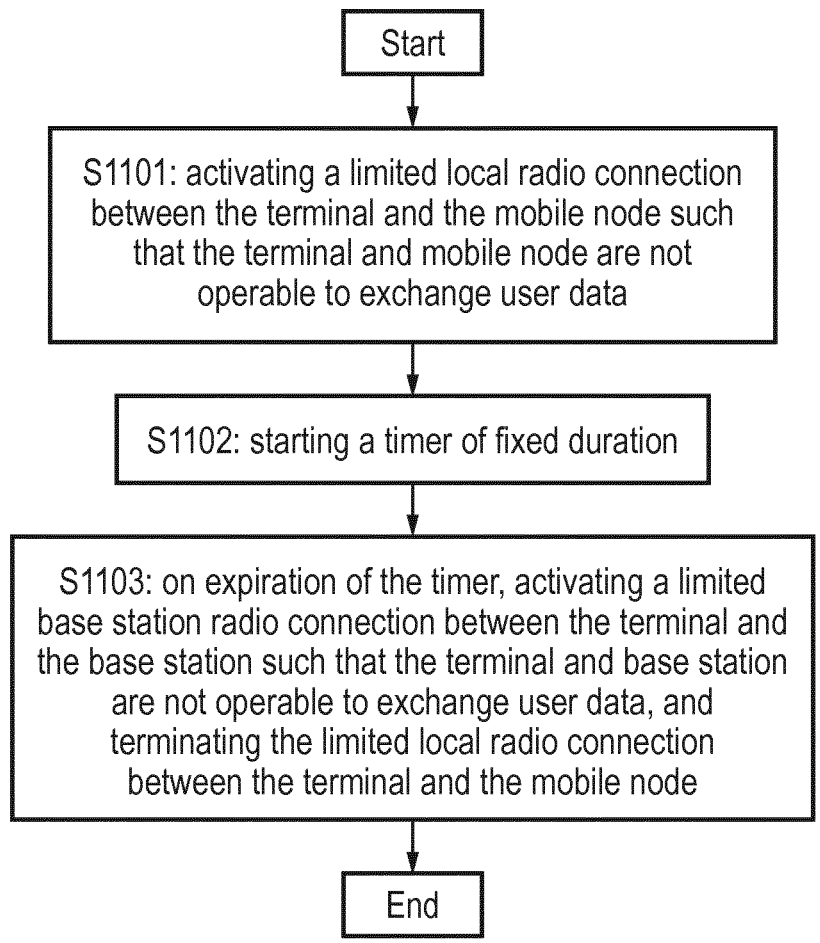
FIG. 15 shows a flow chart of steps in an example method for use in a mobile telecommunications system or network.

FIG. 15 illustrates an example method for use in a mobile telecommunications network or system. The mobile telecommunications network or system comprises a base station providing wireless connectivity within a base station cell, a mobile node operable to provide wireless connectivity within a local cell and configured to communicate with the base station, and a terminal configured to communicate wirelessly with either or both of the base station and the mobile node. The method starts, and at S1101 a limited local radio connection between the terminal and the mobile node is activated. Generally, when this limited local radio connection is activated, the terminal and mobile node are not operable to exchange user data such that, while they are connected to each other, they are limited to some signalling or control communications and are not configured to communicate user data such as application data. The method further comprises step S1102 in which a timer of fixed duration is activated when or after the limited local radio connection is activated. The method then comprises step S1103 wherein, on expiration of the timer, a limited base station radio connection between the terminal and the base station is activated, and the limited local radio connection between the terminal and the mobile node is terminated. Generally, when the limited base station radio connection is activated, the terminal and base station are not able to exchange user data.

In some examples, the limited connected mode or state that can be activated by a UE to the VC-UE can be based on the RRC_IDLE or RRC_CONNECTED mode with some functionalities de-activated. For example, if based on the RRC_IDLE mode, the terminal may be configured to carry out: paging, system information acquisition and UE controlled mobility but not some other RRC functionalities including a UE specific DRX configured by upper layers, performance of neighbouring cell measurements and cell (re-)selection based on configuration information from the base station (for example the UE may not receive measurement configuration from the base station in cases where the UE already receives measurement configuration from the local/virtual cell), and performance of logging of available measurements together with location and time for logged measurement configured UEs. In the RRC_IDLE mode, the terminal is not able to communicate user data, and this remains the case in a limited state derived from the RRC_IDLE state.

In another example, if the limited connected state is based on the RRC_CONNECTED state, the following functionalities may be maintained: C-RNTI will be recorded, radio bearer between UE and eNB is retained, network controlled mobility, and acquisition of system information. On the other hand, the following functionalities may not be maintained: transfer of unicast data to/from UE, at lower layers, the UE may be configured with a UE specific DRX, the UE monitoring control channels associated with the shared data channel to determine if data is scheduled for it, the UE providing channel quality and feedback information, and the US performing neighbouring cell measurements and measurement reporting based on configuration information from the base station.

Figure 16:
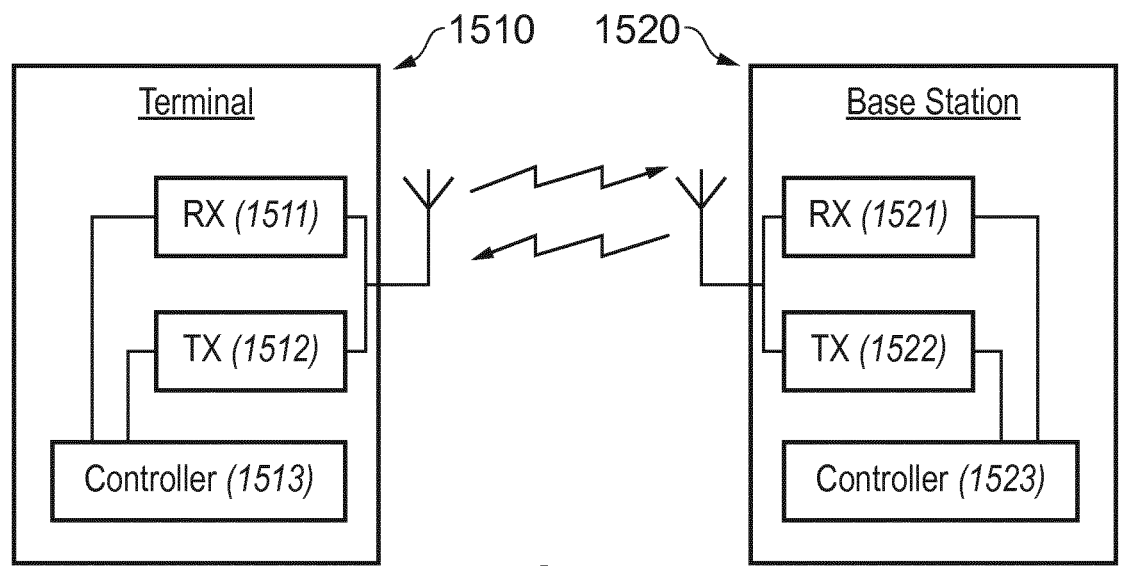
FIG. 16 shows a schematic representation of an example terminal and an example base station in a telecommunications system or network.

FIG. 16 illustrates an example terminal and an example base station configured to communicate with each other and which may implement one or more techniques as discussed herein. The terminal 1510 comprises a receiver 1511 and a transmitter 1512 connected to an antenna for communicating via a wireless interface. The terminal also comprises a controller 1513 for controlling at least the receiver and transmitter of the terminal 1510. In some examples, the terminal may be configured such that the controller, receiver and transmitter may be configured to operate together to operate as a mobile node to provide a local cell to neighbouring terminals. Likewise, the base station 1520 comprises a receiver 1521 and a transmitter 1522 connected to an antenna for communicating via a wireless interface. The base station 1520 also comprises a controller 1523 for controlling at least the receiver and transmitter of the base station 1520. The base station and terminal can communicate over the air, via the wireless interface by transmitting uplink signals from the terminal to the base station and downlink signals from the base station to the terminal. A mobile node in accordance with the present disclosure may also have the same structure as the terminal and/or base station. Although it is generally expected that terminals will be providing local cell functionality, any other suitable node may provide this functionality.

While FIG. 16 shows a schematic illustration of a terminal and of a base station, it will be appreciated that while in examples of the present disclosure, each terminal includes a transmitter, receiver and controller and each base station includes a transmitter, receiver and controller so as to allow communication between the terminals and/or base stations, the terminal and base station may be implemented using any appropriate technique. For example, the controller may comprise one or more processor units which are suitably configured/programmed to provide the desired functionality described herein using conventional programming/configuration techniques for equipment in wireless telecommunications systems. For each terminal, the transmitter, receiver and controller are schematically shown in FIG. 16 as separate elements for ease of representation. However, it will be appreciated that for each terminal the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the terminals will in general comprise various other elements associated with their operating functionality in accordance with established wireless telecommunications techniques (e.g. a power source, possibly a user interface, and so forth).

Generally, in the present disclosure the prefix RRC has been used for states and connections with the base station and the prefix VC_RRC for states and connections with the mobile node for the local or virtual cell. However, these have been used in the interest of conciseness only, and unless they are being used specifically in the context RRC only, they are not limited to connections or states of the 3GPP (or equivalent) RRC protocol and are also intended to refer to any other radio resources control protocol.

Also, the radio resources control protocol, procedure, states or connections can also be referred to herein as radio, radio control or radio resources protocol, procedure, states or connections, respectively.

As used herein, the term mobile node is used to refer to the node providing the local/virtual cell and the mobile node functionality may be provided by a terminal, a relay node, a base station, a dedicated node, or any other suitable node.

As used herein, transmitting information or a message to an element may involve sending one or more messages to the element and may involve sending part of the information separately from the rest of the information. The number of "messages" involved may also vary depending on the layer or granularity considered. For example transmitting a message may involve using several resource elements in an LTE environment such that several signals at a lower layer correspond to a single message at a higher layer. Also, transmissions from one terminal to another may relate to the transmission of any one or more of user data, discovery information, control signalling and any other type of information to be transmitted.

Also, whenever an aspect is disclosed in respect of an apparatus or system, the teachings are also disclosed for the corresponding method. Likewise, whenever an aspect is disclosed in respect of a method, the teachings are also disclosed for any suitable corresponding apparatus or system. Additionally, it is also hereby explicitly disclosed that for any teachings relating to a method or a system where it has not been clearly specified which element or elements are configured to carry out a function or a step, any suitable element or elements that can carry out the function can be configured to carry out this function or step. For example any one or more of a terminal, a mobile node, a base station or any other mobile node may be configured accordingly if appropriate, so long as it is technically feasible and not explicitly excluded.

Whenever the expressions "greater than", or "smaller than" or equivalent are used herein, it is intended that they discloses both alternatives "and equal to" and "and not equal to" unless one alternative is expressly excluded.

Note that while the present disclosure has been presented largely in the context of LTE and/or D2D, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard (e.g. the 5G standards).

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public. Respective features of the present disclosure are defined by the following numbered clauses:

Clause 1. A method for use in a mobile telecommunications network, the mobile telecommunications network comprising a base station providing wireless connectivity within a base station cell, a mobile node providing wireless connectivity within a local cell and configured to communicate wirelessly with the base station, and a terminal configured to communicate wirelessly with the base station and configured to communicate wirelessly with the mobile node; the method comprising:

activating a limited local radio connection between the terminal and the mobile node;

starting a first timer of fixed duration when or after the limited local radio connection is activated; and when the first timer has expired, activating a limited base station radio connection between the terminal and the base station and terminating the limited local radio connection between the terminal and the mobile node.

Clause 2. The method of clause 1 in which the activating the limited local radio connection between the terminal and the mobile node is performed by transitioning from a full local radio connection between the terminal and the mobile node to the limited local radio connection when a transfer of data between the terminal and the mobile node has been completed.

Clause 3. The method of clause 1 or 2, and further comprising, if there is a need for a transfer of data between the terminal and the mobile node before the first timer has expired, transitioning from the limited local radio connection to a full local radio connection between the terminal and the mobile node; and deactivating the first timer.

Clause 4. The method of any one of clauses 1-3, and further comprising:

monitoring for a requirement to transfer data between the terminal and the mobile node after the first timer has started;

if the requirement occurs, transitioning from the limited local radio connection to a full local radio connection between the terminal and the mobile node; and deactivating the first timer.

Clause 5. The method of any one of clauses 1-4, in which the first timer belongs to the terminal.

Clause 6. The method of clause 5, in which the fixed duration of the first timer is set during manufacture or maintenance of the terminal.

Clause 7. The method of clause 5, in which the fixed duration of the first timer is determined by the mobile node and provided to the terminal by the mobile node.

Clause 8. The method of clause 5, in which the fixed duration of the first timer is determined with reference to an extent of coverage of the local cell and/or a buffer status of the mobile node or the base station.

Clause 9. The method of any one of clauses 1-8, further comprising activating the mobile node to provide wireless connectivity to the terminal within the local cell;

starting a second timer of fixed duration when or after the mobile node is activated;

when the second timer has expired, terminating activity of the mobile node that provides the wireless connectivity to the terminal.

Clause 10. The method of clause 9, in which activating the mobile node includes transitioning from a limited base station radio connection between the mobile node and the base station to a full base station radio connection between the mobile node and the base station.

Clause 11. The method of clause 9 or clause 10, and further comprising:

monitoring for data transmission and/or reception between the mobile node and the terminal after the second timer has started; and if said data transmission and/or reception occurs, restarting the second timer.

Clause 12. The method of any one of clauses 9-11, in which the fixed duration of the second timer is equal to or longer than the fixed duration of the first timer.

Clause 13. The method of any one of clauses 9-12, in which the second timer belongs to the mobile node.

Clause 14. The method of any one of clauses 9-13, in which the fixed duration of the second timer is set during manufacture or maintenance of the mobile node.

Clause 15. The method of any one of clauses 9-13, in which the fixed duration of the second timer is determined by the mobile node or the base station.

Clause 16. The method of any one of clauses 9-13, in which the fixed duration of the second timer is determined with reference to an extend of coverage of the local cell and/or a buffer status of the mobile node or the base station.

Clause 17. The method of any one of clauses 1-16, further comprising:

before or after starting the first timer, monitoring the quality of a full base station radio connection between the mobile node and the base station; and if the quality falls below a first threshold, terminating provision of wireless connectivity within the local cell by the mobile node.

Clause 18. The method of clause 17, further comprising, before terminating provision of wireless connectivity with the local cell, triggering the terminal to periodically report to the mobile node the quality of a limited or full local radio connection between the terminal and the mobile node.

Clause 19. The method of clause 18, further comprising:

monitoring the reported quality of the radio connection between the terminal and the mobile node; and if the reported quality falls below a second threshold, performing a handover of the terminal from the local cell to the base station cell or a different local cell.

Clause 20. The method of clause 19, in which, if the reported quality remains at or above the second threshold, checking the quality of the full base station radio connection between the mobile node and the base station and if it has risen above the first threshold, stopping the terminal from periodically reporting to the mobile node the quality of the radio connection between the terminal and the mobile node.

Clause 21. A mobile telecommunications network, the mobile telecommunications network comprising a base station providing wireless connectivity within a base station cell, a mobile node providing wireless connectivity within a local cell and configured to communicate wirelessly with the base station, and a terminal configured to communicate wirelessly with the base station and configured to communicate wirelessly with the mobile node, wherein the mobile telecommunications network is configured to:

activate a limited local radio connection between the terminal and the mobile node;

start a first timer of fixed duration when or after the limited local radio connection is activated; and when the first timer has expired, activate a limited base station radio connection between the terminal and the base station and terminate the limited local radio connection between the terminal and the mobile node.

Clause 22. A mobile telecommunications network, the mobile telecommunications network comprising a base station providing wireless connectivity within a base station cell, a mobile node providing wireless connectivity within a local cell and configured to communicate wirelessly with the base station, and a terminal configured to communicate wirelessly with the base station and configured to communicate wirelessly with the mobile node, wherein the mobile telecommunications network is configured to carry out the method of any one of clauses 1-20.

Clause 23. A method of operating a terminal for use in a mobile telecommunications network comprising a base station providing wireless connectivity within a base station cell, and a mobile node providing wireless connectivity within a local cell and configured to communicate wirelessly with the base station, wherein the terminal comprises a transmitter, a receiver and a controller and is configured to communicate wirelessly with the base station and to communicate wirelessly with the mobile node, the method comprising:

the terminal activating a limited local radio connection between the terminal and the mobile node;

the terminal starting a first timer of fixed duration when or after the limited local radio connection is activated; and when the first timer has expired, the terminal activating a limited base station radio connection between the terminal and the base station and terminating the limited local radio connection between the terminal and the mobile node.

Clause 24. The method of clause 23, in which the terminal activating the limited local radio connection between the terminal and the mobile node is performed by the terminal transitioning from a full local radio connection between the terminal and the mobile node to the limited local radio connection when a transfer of data between the terminal and the mobile node has been completed.

Clause 25. The method of clause 23 or clause 24, and further comprising:

the terminal monitoring for a requirement to transfer data between the terminal and the mobile data after the first timer has started;

if the requirement occurs, the terminal transitioning from the limited local radio connection to a full local radio connection between the terminal and the mobile node;

the terminal deactivating the first timer.

Clause 26. The method of any one of clauses 23-25, in which the first timer belongs to the terminal.

Clause 27. The method of any one of clauses 23-26, further comprising setting the fixed duration of the first timer during manufacture or maintenance of the terminal.

Clause 28. The method of any one of clauses 23-26, further comprising the terminal receiving the fixed duration of the first timer from the mobile node.

Clause 29. The method of any one of clauses 23-28, further comprising:

the terminal periodically reporting to the mobile node the quality of a limited or full local radio connection between the terminal and the mobile node, in response to a trigger from the mobile node following a fall below a first threshold of the quality of a full base station radio connection between the mobile node and the base station.

Clause 30. The method of clause 29, further comprising:
the terminal participating in a handover from the local cell to the base station or a different local cell if the reported quality of radio connection between the terminal and the mobile node falls below a second threshold.

Clause 31. The method of clause 30, further comprising:
the terminal ceasing to periodically report to the mobile node the quality of the radio connection between the terminal and the mobile node if the quality of the full base station radio connection between the mobile node and the base station rises above the first threshold.

Clause 32. A terminal for use in a mobile telecommunications network comprising a base station providing wireless connectivity within a base station cell, and a mobile node providing wireless connectivity within a local cell and configured to communicate wirelessly with the base station, wherein the terminal comprises a transmitter, a receiver and a controller and is configured to communicate wirelessly with the base station and to communicate wirelessly with the mobile node, wherein the terminal is further configured to:
activate a limited local radio connection between the terminal and the mobile node;
start a first timer of fixed duration when or after the limited local radio connection is activated; and
when the first timer has expired, activate a limited base station radio connection between the terminal and the base station and terminating the limited local radio connection between the terminal and the mobile node.

Clause 33. Circuitry for a terminal for use in a mobile telecommunications network comprising a base station providing wireless connectivity within a base station cell, and a mobile node providing wireless connectivity within a local cell and configured to communicate wirelessly with the base station; wherein the circuitry comprises a controller element and a transceiver element configured to operate together to:
activate a limited local radio connection between the terminal and the mobile node;
start a first timer of fixed duration when or after the limited local radio connection is activated; and
when the first timer has expired, activate a limited base station radio connection between the terminal and the base station and terminating the limited local radio connection between the terminal and the mobile node.

Clause 34. A method of operating a mobile node in a mobile telecommunications network comprising a base station providing wireless connectivity within a base station cell, the mobile node which is configured to provide wireless connectivity within a local cell and configured to communicate wirelessly with the base station, and a terminal configured to communicate wirelessly with the base station and configured to communicate wirelessly with the mobile node, the method comprising the mobile node:
activating wireless connectivity to the terminal within the local cell;
starting a timer of fixed duration when or after wireless connectivity is activated; and
when the timer has expired, terminating the wireless connectivity to the terminal within the local cell.

Clause 35. The method of clause 34, in which the mobile node activating the wireless connectivity to the terminal within the local cell includes the mobile node transitioning from a limited base station radio connection between the mobile node and the base station to a full base station radio connection between the mobile node and the base station.

Clause 36. The method of clause 34 or clause 35, further comprising the mobile node:
monitoring for data transmission and/or reception between the mobile node and the terminal after the timer has started; and
if said data transmission and/or reception occurs, restarting the timer.

Clause 37. The method of any one of clauses 34-36, in which the fixed duration of the timer is equal to or longer than a fixed duration of a first timer belonging to the terminal and able to be activated when or after a limited local radio connection between the terminal and the mobile node is activated.

Clause 38. The method of any one of clauses 34-37, in which the timer belongs to the mobile node.

Clause 39. The method of clause 38, further comprising setting the fixed duration of the timer during manufacture or maintenance of the mobile node.

Clause 40. The method of clause 38, further comprising the mobile node determining the fixed duration of the timer with reference to an extent of coverage of the local cell and/or a buffer status of the mobile node or the base station.

Clause 41. The method of any one of clauses 34-40, further comprising the mobile node:
monitoring the quality of a full base station radio connection between the mobile node and the base station; and
if the quality falls below a first threshold, terminating provision of wireless connectivity within the local cell.

Clause 42. The method of clause 41, further comprising the mobile node:
before terminating provision of wireless connectivity with the local cell, triggering the terminal to periodically report to the mobile node the quality of a limited or full local radio connection between the terminal and the mobile node.

Clause 43. The method of clause 42, further comprising the mobile node:
monitoring the reported quality of the radio connection between the terminal and the mobile node; and
if the reported quality falls below a second threshold, initiating a handover of the terminal from the local cell to the base station cell or a different local cell.

Clause 44. The method of clause 43, in which, if the reported quality remains at or above the second threshold, the mobile node checks the quality of the full base station radio connection between the mobile node and the base station and if it has risen above the first threshold, stops the terminal from periodically reporting to the mobile node the quality of the radio connection between the terminal and the mobile node.

Clause 45. A mobile node for use in a mobile telecommunications network comprising a base station providing wireless connectivity within a base station cell, the mobile node which is configured to provide wireless connectivity within a local cell and configured to communicate wirelessly with the base station, and a terminal configured to communicate wirelessly with the base station and configured to communication wirelessly with the mobile node, the mobile node comprising a transmitter, a receiver and a controller, and further configured to:
activate wireless connectivity to the terminal within the local cell;
start a timer of fixed duration when or after wireless connectivity is activated; and
when the timer has expired, terminate the wireless connectivity to the terminal within the local cell.

Clause 46. Circuitry for a mobile node for use in a mobile telecommunications network comprising a base station providing wireless connectivity within a base station cell, the mobile node, and a terminal configured to communicate wirelessly with the base station and configured to communicate wirelessly with the mobile node, circuitry comprising a controller element and a transceiver element configured to:
operate together to provide wireless connectivity within a local cell and to communicate with the base station;
activate wireless connectivity to the terminal within the local cell;
start a timer of fixed duration when or after the wireless connectivity to the terminal within the local cell is activated; and
when the timer has expired, terminate the wireless connectivity to the terminal within the local cell.

Clause 47. A method of operating a base station in a mobile telecommunications network, the base station comprising a transmitter, a receiver and a controller and being configured to provide wireless connectivity within a base station cell, the mobile telecommunications network comprising the base station, a mobile node providing wireless connectivity within a local cell and configured to communicate wirelessly with the base station, and a terminal configured to communicate wirelessly with the base station and configured to communicate wirelessly with the mobile node, the base station further configured to:
activate a limited base station radio connection between the terminal and the base station when a timer of fixed duration has expired after having been started in response to activation of a limited local radio connection between the terminal and the mobile node.

Clause 48. A base station for use in a mobile telecommunications network comprising the base station, a mobile node providing wireless connectivity within a local cell and configured to communicate wirelessly with the base station, and a terminal configured to communicate wirelessly with the base station and configured to communicate wirelessly with the mobile node, the base station comprising a transmitter, a receiver and a controller and being configured to:
provide wireless connectivity within a base station cell; and
activate a limited base station radio connection between the terminal and the base station when a timer of fixed duration has expired after having been started in response to activation of a limited local radio connection between the terminal and the mobile node.

Clause 49. Circuitry for a base station for use in a mobile telecommunications network comprising the base station, a mobile node providing wireless connectivity within a local cell and configured to communicate wirelessly with the base station, and a terminal configured to communicate wirelessly with the base station and configured to communicate wirelessly with the mobile node, the circuitry comprising a controller element and a transceiver element configured to:
provide wireless connectivity within a base station cell; and
activate a limited base station radio connection between the terminal and the base station when a timer of fixed duration has expired after having been started in response to activation of a limited local radio connection between the terminal and the mobile node.

Clause 50. Computer software which, when executed by a computer causes the computer to perform the methods of any one of clauses 1-20, 23-31, 34-44 or 47.

Clause 51. A storage medium which store computer software according to clause 50.

REFERENCES

[1] Holma H. and Toskala A., "LTE for UMTS OFDMA and SC-FDMA based radio access", John Wiley and Sons, 2009
[2] TS 36.331, v12.7.0, 2015-09, Technical Specification Document for "Evolved Universal Terrestrial Radio Access (E-UTRA); Radio Resource Control (RRC); Protocol specification"
[3] 3GPP TS 36.300:4.7 Support for relaying

What is claimed is:

1. A method for use in a mobile telecommunications network, the mobile telecommunications network comprising a base station providing wireless connectivity within a base station cell, a mobile node providing wireless connectivity within a local cell and configured to communicate wirelessly with the base station, and a terminal configured to communicate wirelessly with the base station and configured to communicate wirelessly with the mobile node; the method comprising:
activating a limited local radio connection between the terminal and the mobile node, wherein the local cell corresponding to the mobile node is established on-demand in response to a spatial concentration of a plurality of terminals, the mobile node being selected from the plurality of terminals in the spatial concentration based on the mobile node having an idle state, the base station causing a remainder of the plurality of terminal devices in the spatial concentration to handover from the base station to the mobile node, the remaining terminal devices being prioritized for the handover based on performance;
starting a first timer of fixed duration when or after the limited local radio connection is activated;
before or after starting the first timer, monitoring a quality of a full base station radio connection between the mobile node and the base station;
if the quality falls below a first threshold, terminating provision of wireless connectivity within the local cell by the mobile node; and
when the first timer has expired, activating a limited base station radio connection between the terminal and the base station and terminating the limited local radio connection between the terminal and the mobile node.

2. A method of operating a terminal for use in a mobile telecommunications network comprising a base station providing wireless connectivity within a base station cell, and a mobile node providing wireless connectivity within a local cell and configured to communicate wirelessly with the base station, wherein the terminal comprises a transmitter, a receiver and a controller and is configured to communicate wirelessly with the base station and to communicate wirelessly with the mobile node, the method comprising:
the terminal activating a limited local radio connection between the terminal and the mobile node, wherein the local cell corresponding to the mobile node is established on-demand in response to a spatial concentration of a plurality of terminals, the mobile node being selected from the plurality of terminals in the spatial concentration based on the mobile node having an idle state, the base station causing a remainder of the plurality of terminal devices in the spatial concentration to handover from the base station to the mobile node, the remaining terminal devices being prioritized for the handover based on performance;
the terminal starting a first timer of fixed duration when or after the limited local radio connection is activated;

before or after starting the first timer, monitoring a quality of a full base station radio connection between the mobile node and the base station;

if the quality falls below a first threshold, terminating provision of wireless connectivity within the local cell by the mobile node; and when the first timer has expired, the terminal activating a limited base station radio connection between the terminal and the base station and terminating the limited local radio connection between the terminal and the mobile node.

3. The method of claim 2, in which the terminal activating the limited local radio connection between the terminal and the mobile node is performed by the terminal transitioning from a full local radio connection between the terminal and the mobile node to the limited local radio connection when a transfer of data between the terminal and the mobile node has been completed.

4. The method of claim 2, and further comprising:

the terminal monitoring for a requirement to transfer data between the terminal and the mobile node after the first timer has started;

if the requirement occurs, the terminal transitioning from the limited local radio connection to a full local radio connection between the terminal and the mobile node;

the terminal deactivating the first timer.

5. The method of claim 2, in which the first timer belongs to the terminal.

6. The method of claim 2, further comprising setting the fixed duration of the first timer during manufacture or maintenance of the terminal.

7. The method of claim 2, further comprising the terminal receiving the fixed duration of the first timer from the mobile node.

8. The method of claim 2, further comprising:

the terminal periodically reporting to the mobile node the quality of a limited or full local radio connection between the terminal and the mobile node, in response to a trigger from the mobile node following a fall below a first threshold of the quality of a full base station radio connection between the mobile node and the base station.

9. The method of claim 8, further comprising:

the terminal participating in a handover from the local cell to the base station or a different local cell if the reported quality of radio connection between the terminal and the mobile node falls below a second threshold.

10. The method of claim 9, further comprising:

the terminal ceasing to periodically report to the mobile node the quality of the radio connection between the terminal and the mobile node if the quality of the full base station radio connection between the mobile node and the base station rises above the first threshold.

11. A method of operating a mobile node in a mobile telecommunications network comprising a base station providing wireless connectivity within a base station cell, the mobile node which is configured to provide wireless connectivity within a local cell and configured to communicate wirelessly with the base station, and a terminal configured to communicate wirelessly with the base station and configured to communicate wirelessly with the mobile node, the method comprising the mobile node:

activating wireless connectivity to the terminal within the local cell, wherein the local cell corresponding to the mobile node is established on-demand in response to a spatial concentration of a plurality of terminals, the mobile node being selected from the plurality of terminals in the spatial concentration based on the mobile node having an idle state, the base station causing a remainder of the plurality of terminal devices in the spatial concentration to handover from the base station to the mobile node, the remaining terminal devices being prioritized for the handover based on performance;

starting a timer of fixed duration when or after wireless connectivity is activated;

before or after starting the first timer, monitoring a quality of a full base station radio connection between the mobile node and the base station;

if the quality falls below a first threshold, terminating provision of wireless connectivity within the local cell by the mobile node; and when the timer has expired, terminating the wireless connectivity to the terminal within the local cell.

12. The method of claim 11, in which the mobile node activating the wireless connectivity to the terminal within the local cell includes the mobile node transitioning from a limited base station radio connection between the mobile node and the base station to a full base station radio connection between the mobile node and the base station.

13. The method of claim 11, further comprising the mobile node:

monitoring for data transmission and/or reception between the mobile node and the terminal after the timer has started; and if said data transmission and/or reception occurs, restarting the timer.

14. The method of claim 11, in which the fixed duration of the timer is equal to or longer than a fixed duration of a first timer belonging to the terminal and able to be activated when or after a limited local radio connection between the terminal and the mobile node is activated.

15. The method of claim 11, in which the timer belongs to the mobile node.

16. The method of claim 15, further comprising setting the fixed duration of the timer during manufacture or maintenance of the mobile node.

17. The method of claim 15, further comprising the mobile node determining the fixed duration of the timer with reference to an extent of coverage of the local cell and/or a buffer status of the mobile node or the base station.

18. The method of claim 11, further comprising the mobile node:

monitoring the quality of a full base station radio connection between the mobile node and the base station; and if the quality falls below a first threshold, terminating provision of wireless connectivity within the local cell.

19. The method of claim 18, further comprising the mobile node:

before terminating provision of wireless connectivity with the local cell, triggering the terminal to periodically report to the mobile node the quality of a limited or full local radio connection between the terminal and the mobile node.

20. The method of claim 19, further comprising the mobile node:

monitoring the reported quality of the radio connection between the terminal and the mobile node; and if the reported quality falls below a second threshold, initiating a handover of the terminal from the local cell to the base station cell or a different local cell.

21. The method of claim 20, in which, if the reported quality remains at or above the second threshold, the mobile node checks the quality of the full base station radio connection between the mobile node and the base station and if it has risen above the first threshold, stops the terminal from periodically reporting to the mobile node the quality of the radio connection between the terminal and the mobile node.

* * * * *